United States Patent
Meuler et al.

(10) Patent No.: US 9,650,518 B2
(45) Date of Patent: May 16, 2017

(54) LIQUID REPELLENT SURFACES

(71) Applicants: Massachusetts Institute of Technology, Cambridge, MA (US); The United States of America as Represented by the Secretary of the Air Force, Washington, DC (US)

(72) Inventors: Adam J. Meuler, Malden, MA (US); Robert E. Cohen, Jamaica Plain, MA (US); Gareth H. McKinley, Acton, MA (US); Joseph M. Mabry, Lancaster, CA (US)

(73) Assignees: MASSACHUSETTS INSTITUTE OF TECHNOLOGY, Cambridge, MA (US); THE UNITED STATES OF AMERICA AS REPRESENTED BY THE SECRETARY OF THE AIR FORCE, Washington, DC (US)

( * ) Notice: Subject to any disclaimer, the term of this patent is extended or adjusted under 35 U.S.C. 154(b) by 441 days.

(21) Appl. No.: 13/734,446

(22) Filed: Jan. 4, 2013

(65) Prior Publication Data
US 2013/0178568 A1    Jul. 11, 2013

Related U.S. Application Data

(60) Provisional application No. 61/538,826, filed on Jan. 6, 2012.

(51) Int. Cl.
C09D 5/00 (2006.01)
C09D 5/16 (2006.01)
C09D 7/12 (2006.01)
C08K 5/549 (2006.01)

(52) U.S. Cl.
CPC ............. C09D 5/00 (2013.01); C09D 5/1625 (2013.01); C09D 7/1216 (2013.01); C08K 5/549 (2013.01)

(58) Field of Classification Search
CPC ...... C09D 5/00; C09D 5/1625; C09D 7/1216; C08K 5/549
USPC .................................................. 524/263, 269
See application file for complete search history.

(56) References Cited

U.S. PATENT DOCUMENTS

2010/0316842 A1* 12/2010 Tuteja et al. ................. 428/143
2012/0000853 A1* 1/2012 Tuteja et al. ................. 210/650

* cited by examiner

*Primary Examiner* — Ling Choi
*Assistant Examiner* — Ronald Grinsted
(74) *Attorney, Agent, or Firm* — Steptoe & Johnson LLP

(57) ABSTRACT

A surface can be coated with a liquid repellent coating. Materials for making the liquid repellent coating (e.g., a fingerprint resistant coating) can be selected on the basis of surface energy considerations, such as a receding surface energy. The materials can include a polymer and a liquid repelling material, for example, poly(ethyl methacrylate) and a fluorinated silsesquioxane such as fluorodecyl POSS.

13 Claims, 7 Drawing Sheets

$R_f = CH_2CH_2CF_2CF_2CF_2CF_2CF_2CF_2CF_2CF_3$

LIQUID REPELLENT SURFACES

CLAIM OF PRIORITY

This application claims priority to provisional U.S. Patent Application No. 61/583,826, filed Jan. 6, 2012, which is incorporated by reference in its entirety.

FEDERALLY SPONSORED RESEARCH OR DEVELOPMENT

This invention was made with government support under Grant No. FA9300-09-C-0023 awarded by the U.S. Air Force. The government has certain rights in this invention.

TECHNICAL FIELD

This invention relates to liquid repellent surfaces.

BACKGROUND

The smudging of surfaces, particularly of smooth surfaces, by fingerprints is a problem that is growing in importance as touchscreen devices proliferate. Touchscreen surfaces that are resistant to the transfer or smudging of fingerprints are desirable for aesthetic and technological reasons. Surface coatings can impart desirable properties including resistance to fingerprint transfer, high transmission, low haze, and robustness to repeated use. A fingerprint resistant surface should be resistant to both water and oil transfer when touched by skin. Such a surface should be both hydrophobic and oleophobic, or at the extremes, superhydrophobic and/or superoleophobic.

SUMMARY

An attractive strategy for mitigating the fingerprinting problem is to deposit a coating of optically transparent oleophobic materials that resist wetting by the oils that are commonly found on human skin. The goal is to have the oils stick more strongly to the skin than they do to the coated surface, such that they are not transferred to the coated surface upon contact. Similarly, it can be advantageous to have the oils stick more strongly to a second surface (e.g., that of a wipe) than to the coated surface, thereby facilitating removal of oils from the coated surface. Selecting materials that will impart a desired surface energy can be important in forming a fingerprint resistant coating. In particular, the coating desirably has a low surface energy as calculated from receding liquid contact angles (referred to as a receding surface energy).

In one aspect, a method of making a liquid repellent coating on a surface includes selecting a polymer and a liquid repelling material based on a measured surface energy of a coating including the polymer and the liquid repelling material; combining the selected polymer and the selected liquid repelling material to form a mixture; and contacting the mixture with the surface to form a coating including the selected polymer and the selected liquid repelling material on the surface.

The surface can be a nominally smooth surface. In other words, the surface can be one that does not include any engineered textural features (such as nano- or micro-sized textural features adapted for their surface-modifying effects). Thus the surface can be, for example, smooth glass or plastic, such as might be found on a display screen or touchscreen. However, the surface is not required to be nominally smooth. Textured surfaces having the liquid repellent coating can also have the desired liquid repelling properties. The liquid repelling material can include, for example, a small molecule, a nanoparticle, a polymer, or a combination thereof.

In some cases, the liquid repelling material can be enriched at the coating-air interface. In other words, when forming the coating, the liquid repelling material tends to be located preferentially toward the air-coating interface rather than being uniformly distributed through the thickness of the coating. The coating can show good surface adhesion, such that it is not easily removed from the surface once formed. In other circumstances, the coating can be peeled away from the surface on which it is initially formed, which can be useful when, for example, the coating is desirably removable or transferable to another surface.

The measured surface energy can be a receding surface energy. The measured receding surface energy can be $\gamma_{sv,r}$, $\gamma_{sv,r}^{d}$, $\gamma_{sv,r}^{P}$, $\gamma_{sv,r}^{+}$, or $\gamma_{sv,r}^{-}$. The measured receding surface energy, $\gamma_{sv,r}$, can be no greater than 50 mN m$^{-1}$, no greater than 20 mN m$^{-1}$, or no greater than 15 mN m$^{-1}$. The method can further include measuring a surface energy of a coating including a polymer and a liquid repelling material prior to selecting. Combining can include combining the selected polymer and the selected liquid repelling material in a predetermined ratio.

The coating can be a fingerprint-resistant coating. The coating can be transparent and optically clear. The surface can be transparent. The nanoparticles can include a fluorinated silsesquioxane. The fluorinated silsesquioxane can be fluorodecyl polyhedral oligomeric silsesquioxane (fluorodecyl POSS). The polymer can be poly(methyl methacrylate) (PMMA), poly(ethyl methacrylate) (PEMA), poly(butyl methacrylate) (PBMA), a fluoropolymer, or a combination thereof. Contacting the mixture with the surface can include spin coating.

Other aspects, embodiments, and features will be apparent from the following description, the drawings, and the claims.

as a function of $\overline{\theta}$.

Figure 3:
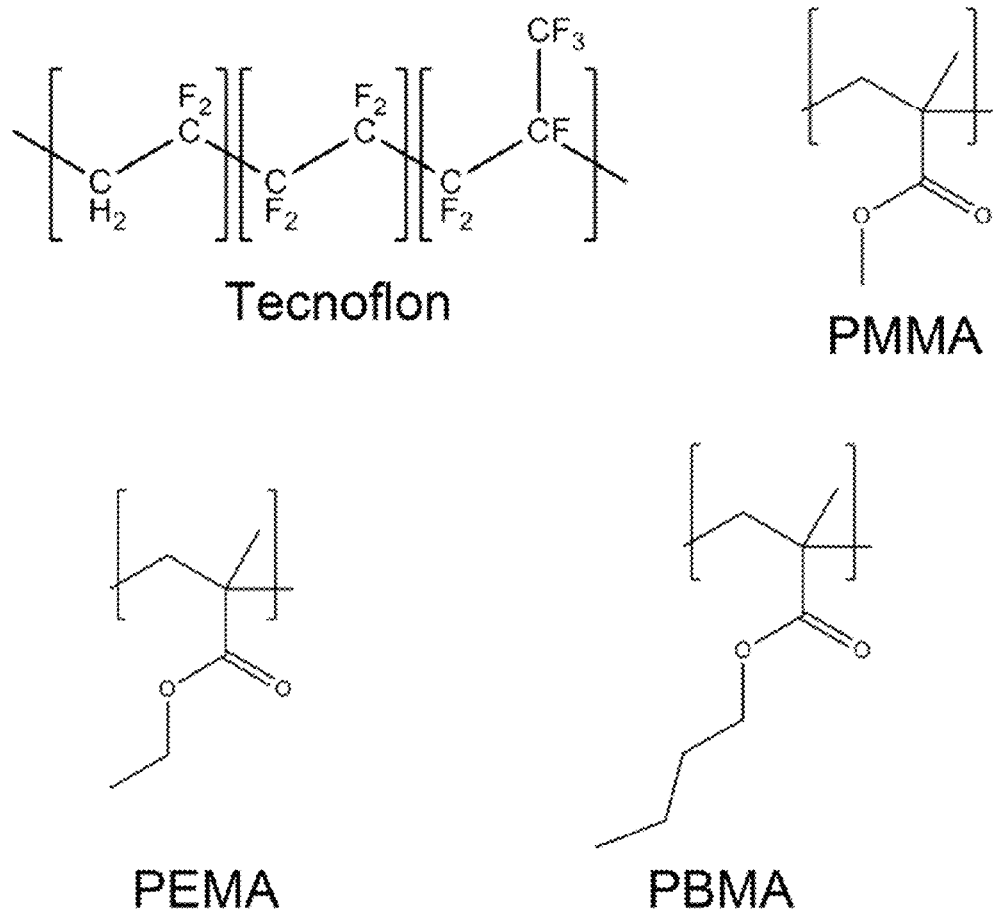

FIG. 3 are drawings depicting the chemical structures of polymers that can be blended with fluorodecyl POSS.

Figure 4:
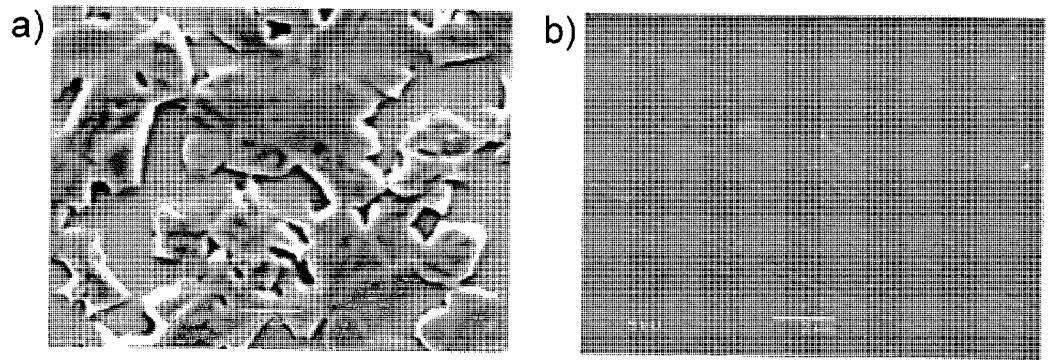

FIG. 4 are scanning electron micrographs of films of (a) "rough" fluorodecyl POSS and (b) 80/20 PMMA/fluorodecyl POSS spin cast onto silicon wafers. AFM analysis of 1 μm×1 μm areas of the surfaces yielded root-mean square roughness $R_q$ of (a) $R_q$=86 nm (b) $R_q$=2.6 nm.

FIG. 5A-D are graphs showing (A) Advancing and receding contact angles $\theta_{adv}$ and $\theta_{rec}$ for drops of water ($\gamma_{lv}$=72.1 mN/m) on all of the tested polymer/fluorodecyl POSS surfaces. (B) $\theta_{adv}$ and $\theta_{rec}$ for drops of ethylene glycol ($\gamma_{lv}$=47.7 mN/m) on the PMMA/fluorodecyl POSS and Tecnoflon/fluorodecyl POSS materials. (C) $\theta_{adv}$ and $\theta_{rec}$ for drops of dimethyl sulfoxide ($\gamma_{lv}$=44.0 mN/m) on the PMMA/ fluorodecyl POSS and Tecnoflon/fluorodecyl POSS samples. (D) Liquid wettability diagram for water and dimethyl sulfoxide on the PMMA/fluorodecyl POSS and Tecnoflon/fluorodecyl POSS blends.

FIG. 6A-D are graphs showing (A) Advancing and receding contact angles $\theta_{adv}$ and $\theta_{rec}$ for drops of diiodomethane ($\gamma_{lv}$=50.8 mN/m) on all of the tested polymer/fluorodecyl POSS surfaces. (B) $\theta_{adv}$ and $\theta_{rec}$ for drops of rapeseed oil ($\gamma_{lv}$=35.5 mN/m) on the PBMA/fluorodecyl POSS and PMMA/fluorodecyl POSS surfaces. (C) $\theta_{adv}$ and $\theta_{rec}$ for drops of hexadecane ($\gamma_{lv}$=27.5 mN/m) on the PBMA/fluorodecyl POSS and PMMA/fluorodecyl POSS materials. (D) Nonpolar liquid wettability diagram for diiodomethane and hexadecane on the PMMA/fluorodecyl POSS and PBMA/fluorodecyl POSS blends.

FIGS. 7A-B are photographs of diiodomethane droplets on 80/20 PBMA/fluorodecyl POSS. (A) As liquid is syringed into the droplet, the contact angle approaches 141°. (B) When sufficient liquid is added, the drop quickly advances forward to a contact angle of 95°. This sporadic motion is repeated as additional dioodomethane is syringed into the droplet.

FIGS. 8A-D are graphs depicting XPS data acquired for spin-cast films of (A, B) 80/20 PEMA/fluorodecyl POSS and (C, D) 80/20 Tecnoflon/fluorodecyl POSS. Survey spectra for the (A) 80/20 PEMA/fluorodecyl POSS and (C) 80/20 Tecnoflon/fluorodecyl POSS in which the elemental peaks corresponding to F, O, and C are labeled. High resolution carbon is spectra for the (B) 80/20 PEMA/fluorodecyl POSS and (D) 80/20 Tecnoflon/fluorodecyl POSS wherein peaks corresponding to various carbon moieties located near the surface are labeled.

FIGS. 9A-D are graphs depicting the receding and advancing solid surface energy terms as the fluorodecyl POSS content of the blends is increased. (A) Overall advancing and receding surface energy terms $\gamma_{sv,a}$ and $\gamma_{sv,r}$ for the PMMA/fluorodecyl POSS and PBMA/fluorodecyl POSS blends. (B) $\gamma_{sv,a}$ and $\gamma_{sv,r}$ for the PMMA/fluorodecyl POSS and Tecnoflon/fluorodecyl POSS materials. (C) Polar contributions to receding surface energy $\gamma_{sv,r}^{p}$ for the PMMA-based and Tecnoflon-based samples. (D) $\gamma_{sv,r}^{+}$ for the PMMA/fluorodecyl POSS and Tecnoflon/fluorodecyl POSS surfaces.

Figure 10:
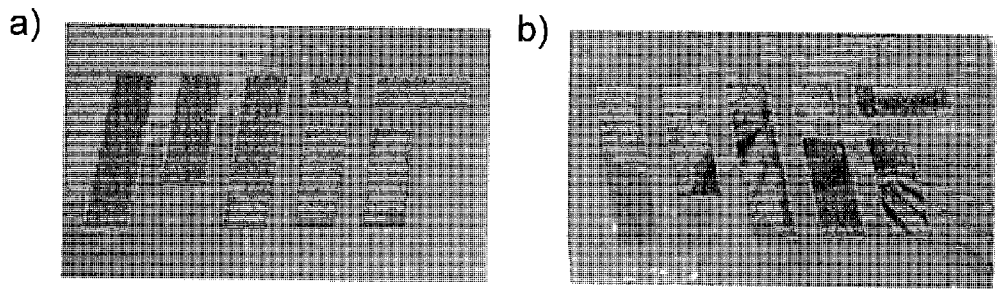

FIGS. 10A-B are photographs of microscope slides placed over a fuchsia background. The slides were spin-coated with (A) 80/20 PEMA/fluorodecyl POSS and (B) fluorodecyl POSS. The coating in (A) is optically transparent and clear while white fluorodecyl POSS powder is visible in (B).

FIG. 11A-B are photographs of silicon wafers that were coated and subjected to a cross-cut adhesion test: (a) 80/20 Tecnoflon/fluorodecyl POSS and (b) 80/20 PEMA/fluorodecyl POSS. The ASTM categorizations of strengths of adhesion of these coatings are (a) 1B (low adhesion) and (b) 5B (highest adhesion).

FIG. 12A-D are photographs of (a) bare glass, (b) PEMA-coated glass, (c) 95/5 PEMA/fluorodecyl POSS-coated glass, and (d) 80/20 PEMA/fluorodecyl POSS-coated glass subjected to the stearic acid fingerprinting test protocol described above. The 80/20 PEMA/fluorodecyl POSS surface in (d) clearly resists smudging by fingerprints more strongly than the bare glass substrate in (a).

DETAILED DESCRIPTION

Surfaces that resist wetting by liquids are of interest for a wide variety of applications, including ink release surfaces for printers, seals/gaskets, stain-resistant fabrics, and fingerprint resistance. See, for example, U.S. Patent Application Publication No. 2011/0025752; S. T. Iacono, et al. *J. Mater Chem.*, 2010, 20, 2979-2984; A. Vilcnik, et al. *Langmuir,* 2009, 25, 5869-5880; S. S. Chhatre, et al. *Langmuir* 2009, 25, 13625-13632; W. Choi, et al. *Adv. Mater.* 2009, 21, 2190-2195; W. Ming, et al. *Contact Angle, Wettability Adhes.*, 2009, 6, 191-205; Y. Gao, et al. *Polymer,* 2010, 51, 5997-6004; and R. Misra, et al. *J. Appl. Polym. Sci.*, 2010, 115, 2322-2331, each of which is incorporated by reference in its entirety.

Surfaces can be coated with polymers having perfluorocyclobutane rings, fluorochemicals, fluorinated organosilane polymers, or fluoropolymer nanoparticles. See, for example, U.S. Pat. No. 7,332,217, U.S. Pat. No. 7,288,282, U.S. Pat. No. 7,638,581, WO 2010/0129624 and EP Publication No. 00490335, each of which is incorporated by reference in its entirety.

The wettability (or, conversely, repellency) of a substrate is sensitive to both topographical texture and surface chemistry. See, for example, R. N. Wenzel, *J. Ind. Eng. Chem.*, 1936, 28, 988-994; A. B. D. Cassie and S. Baxter, *Trans. Faraday Soc.*, 1944, 40, 546-551; and R. E. Johnson, Jr. and R. H. Dettre, *Surfactant Sci. Ser.*, 1993, 49, 1-73, each of which is incorporated by reference in its entirety. Textured surfaces with appropriately designed chemistries and features may impart "super liquid repellency" by trapping air in the surface asperities underneath "Cassie state" liquid droplets. These textured substrates are commonly called "superhydrophobic" when they support Cassie state water droplets with contact angles above 150° and <10° of contact angle hysteresis, and "omniphobic" when both water and lower surface tension liquids such as alkanes adopt Cassie configurations with the same contact angle limitations. See, for example, A. Lafuma and D. Quere, *Nat. Mater,* 2003, 2, 457-460; X. J. Feng and L. Jiang, *Adv. Mater.*, 2006, 18, 3063-3078; A. Tuteja, et al. *Proc. Natl. Acad. Sci. U.S.A.* 2008, 105, 18200-18205; and S. S. Chhatre, et al. *Langmuir,* 2010, 26, 4027-4035, each of which is incorporated by reference in its entirety.

A commonly employed strategy for facilitating the formation of Cassie state liquid droplets is to coat textured substrates with films of low surface energy materials; such a tactic is also widely used to reduce the liquid wettability of smooth surfaces. Zisman and colleagues established that the surface energy values of chemical groups decrease in the order —$CH_2$—>—$CH_3$>—$CF_2$—>—$CF_3$, and substantial research efforts have focused on the development of coatings that enhance liquid repellency by preferentially locating low energy moieties at or near the solid-air interface. See, for example, W. A. Zisman, In *Contact Angle, Wettability, and Adhesion*; F. M. Fowkes, Ed.; Washington, D.C., American Chemical Society, 1964, Vol. 43; H. W. Fox and W. A. Zisman, *J. Colloid Sci.*, 1950, 5, 514-531; H. W. Fox and W. A. Zisman, *J. Colloid Sci.*, 1952, 7, 109-121; M. J. Owen and H. Kobayashi, *Macromol. Symp.*, 1994, 82, 115-123; and S. R. Coulson, et al. *Chem. Mater.*, 2000, 12, 2031-2038, each of which is incorporated by reference in its entirety. One class of materials that has recently received attention as a liquid repellent material is polyhedral oligomeric silsesquioxanes (POSS). POSS compounds are thermally stable molecules comprised of silicon-oxygen cores with organic groups attached to the apex of each silicon atom, and they have found widespread application as additives to enhance the bulk properties of polymer-POSS nanocomposites. See, for example, G. Z. Li, et al. *J. Inorg. Organomet. Polym.*, 2001, 11, 123-154 and S. H. Phillips, et al *Curr. Opin. Solid St. Mater. Sci.,* 2004, 8, 21-29, each of which is incorporated by reference in its entirety.

Recent investigations have demonstrated that POSS materials also hold promise as surface modifiers. One particularly promising POSS compound, and the most liquid repellent of the POSS molecules described in the literature to date, is (1H,1H,2H,2H-heptadecafluorodecyl)$_8$Si$_8$O$_{12}$, or fluorodecyl POSS. See, for example, S. T. Iacono, et al. *Chem. Commun.,* 2007, 4992-4994; J. M. Mabry, et al. *Angew. Chem., Int. Ed.,* 2008, 47, 4137-4140; and S. S. Chhatre, et al. *ACS Appl. Mater. Interfaces,* 2010, 2, 3544-3554, each of which is incorporated by reference in its entirety.

Figure 1:
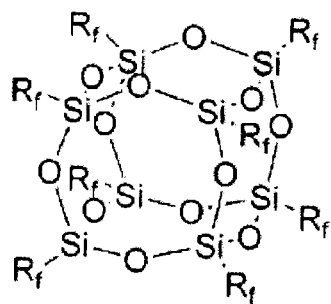
FIG. 1 is a drawing depicting the chemical structure of fluorodecyl POSS.

FIG. 1 shows the structure of fluorodecyl POSS. Droplets of liquids with a range of surface tension values (15.5≤$\gamma_{lv}$≤72.1 mN/m) systematically form higher advancing and receding contact angles on flat films of fluorodecyl POSS than they do on coatings of alternative POSS species or on commercial fluoropolymers such as Tecnoflon or Teflon. The high liquid contact angles adopted by droplets on fluorodecyl POSS coatings are attributed to a synergistic combination of the rigid silicon-oxygen cage and the long fluorodecyl side chains.

There is little consensus in the literature as to specific attributes that categorize a substrate as "liquid repellent," "hydrophobic," or "oleophobic." Often single static contact angles of probe liquids are used to provide some quantification of the wettability of a surface. Static contact angles generally fail to adequately describe the wetting behavior of liquid drops on surfaces, however, and characterizing wettability on the basis of such measurements is of limited utility. See, for example, L. C. Gao and T. J. McCarthy, *Langmuir,* 2008, 24, 9183-9188; L. C. Gao and T. J. McCarthy, *Langmuir,* 2009, 25, 14105-14115; and M. Strobel and C. S. Lyons, *Plasma Processes Polym.,* 2011, 8, 8-13, each of which is incorporated by reference in its entirety.

Surface geometry can impart liquid repellant properties to surfaces, including in some cases super-oleophobic properties. Liquid repellent surfaces can be formed over surfaces having a smooth surface topography, or a textured topography (e.g., a nanotextured topography). In some cases a super-oleophobic surface can make use of a geometry in which the surface has a protrusion portion and a re-entrant portion. This flexibility can allow surfaces having multiple desirable properties to be produced, for example, a surface that is both hydrophobic and oleophobic, and in some cases, both super-hydrophobic and super-oleophilic. Such a surface has been produced and is an excellent oil-water separator. See, for example, U.S. Patent Application Publication No. 2010-0316842, which is incorporated by reference in its entirety.

The methods and surfaces described here can have certain advantages and improvements over other methods of surface modification. For example, super-oleophobic surfaces, i.e. surfaces which are resistant to even the lowest surface tension liquids like decane and octane, can be produced. A re-entrant surface curvature is an optional feature for creating a super-oleophobic surface.

There are a number of different commercial applications for the various types of surfaces produced in this work. The surfaces can be a portion of any article, including a vehicle, equipment, a tool, construction material, a window, a flow reactor, a textile, or others. A few applications for each surface include the following.

Super-hydrophobic and super-oleophillic surfaces can be ideal for oil-water separation, which has a number of useful applications, including waste water treatment and cleaning up oil spills. Other applications include cleaning of ground water, oil well extractions, biodiesel processing, mining operations and food processing.

Super-oleophobic surfaces can be resistant to dust, debris, and in particular, resistant to fingerprints. Such surfaces are therefore useful as a coating on lenses, computer screens, tablet computers, personal data assistants and other displays and handheld devices. Super-oleophobic surfaces can also be used as anti-graffiti self-cleaning surfaces. Super-oleophobic surfaces can also be of great use in the petroleum industry. For example, various surfaces that are attacked by the petroleum products could be lined with super-oleophobic coatings, preventing their degradation, for example, providing swell resistance to organic materials on fabrics. Also, super-oleophobic linings can be used as a drag reducer in various pipelines.

A number of surfaces in nature use extreme water repellency for specific purposes; be it water striding or self cleaning. A number of surfaces encountered in nature are superhydrophobic, displaying water (surface tension γ=72.1 mN/m) contact angles (WCA)>150°, and low contact angle hysteresis. The most widely-known example of a superhydrophobic surface found in nature is the surface of the lotus leaf. It is textured with small 10-20 micron sized protruding nubs which are further covered with nanometer size epicuticular wax crystalloids. See, for example, Barthlott, W. & Neinhuis, C. Purity of the sacred lotus, or escape from contamination in biological surfaces. Planta 202, 1-8 (1997). Numerous studies have shown that it is this combination of surface chemistry plus roughness on multiple scales—micron and nanoscale that imbues super hydrophobic character to the lotus leaf surface. The effects of surface chemistry and surface texture can be controlled to create high levels of oil-repellency and super-oleophobic behavior.

Surface curvature can be used as a third factor, apart from surface energy and roughness, to modify surface wettability. The surface curvature (apart from surface chemistry and roughness), can be used to significantly enhance liquid repellency, as exemplified by studying electrospun polymer fibers containing very low surface energy perfluorinated molecules (FluoroPOSS). Increasing the POSS concentration in the elecrospun fibers can systematically transcend from super-hydrophilic to super-hydrophobic and to the super-oleophobic surfaces (exhibiting low hysteresis and contact angles with decane and octane greater than 150°). See, for example, U.S. Patent Application Publication No. 2010-0316842, which is incorporated by reference in its entirety.

Liquid repelling materials can have hydrophobic and/or oleophobic properties. A liquid repelling material can include halogenated or perhalogenated groups (e.g., fluorinated or perfluorinated groups), for example, fluorinated or perfluorinated organic moieties having between 1 and 20 carbon atoms, in particular, $C_2$-$C_{18}$ alkyl chains, which can be substituted or unsubstituted. The alkyl chains can be substituted with one or more halogens; in some cases the alkyl chains can be nearly perhalogenated or fully perhalogenated. The liquid repelling material can include a silsesquioxane having one or more alkyl chains, which can be halogenated, e.g., nearly perhalogenated or fully perhalogenated.

A class of fluorinated polyhedral oligomeric silsesquioxanes (POSS) molecules has been developed in which the rigid silsesquioxane cage is surrounded by fluoro-alkyl groups. A number of different molecules with different organic groups (including 1H,1H,2H,2H-heptadecafluorodecyl (referred to as fluorodecyl POSS); 1H,1H,2H,2H- tridecafluorooctyl (fluorooctyl POSS) are available, and this class of materials is denoted generically as fluoroPOSS. The fluoroPOSS molecules contain a very high surface concentration of fluorine containing groups, including —$CF_2$— and —$CF_3$ moieties. The high surface concentration and surface mobility of these groups, as well as the relatively high ratio of —$CF_3$ groups with respect to the —$CF_2$— groups results in one of the most hydrophobic and lowest surface energy materials available today. See, for example, Owen, M. J. & Kobayashi, H. Surface active fluorosilicone polymers. Macromol. Symp. 82, 115-123 (1994). (A spin coated film of fluorodecyl POSS on a Si wafer has an advancing and receding water contact angle of 124.5±1.2°, with an rms roughness of 3.5 nm). Blends of a moderately hydrophilic polymer, poly(methyl methacrylate) (PMMA, $M_w$=540 kDa, PDI~2.2) and fluorodecyl POSS can be used in various weight ratios to create materials with different surface properties. Other polymers can be used in place of, or in combination with, PMMA. By varying the mass fraction of fluoroPOSS blended with various polymers, the surface energy of the polymer-fluoroPOSS blend can be systematically changed. This can afford control over the advancing and receding contact angles of the blends and provide a mechanism for systematically studying the transition from the Wenzel to the Cassie state on surfaces made from the blends.

A more useful characterization of wettability can be completed by considering the two physical processes by which sessile liquid drops can be removed from substrates. First, a surface can be tilted (or, alternatively, rotated rapidly) to induce sliding or rolling of a sessile liquid drop. See, for example, C. W. Extrand and A. N. Gent, *J. Colloid Interface Sci.*, 1990, 138, 431-442, which is incorporated by reference in its entirety. The angle of tilt required to induce drop motion (a) does not correlate with any single measured contact angle, but can be predicted using measured receding and advancing contact angles $\theta_{rec}$ and $\theta_{adv}$ and an equation proposed by Furmidge that is consistent with experimental data. See, for example, H. Murase, et al. *J. Appl. Polym. Sci.*, 1994, 54, 2051-2062; C. Della Volpe, et al. *Langmuir*, 2002, 18, 1441-1444; L. Feng, et al. *Langmuir*, 2008, 24, 4114-4119; C. G. Furmidge, *J. Colloid Sci.*, 1962, 17, 309-324; and E. Wolfram and R. Faust, In *Wetting, Spreading, and Adhesion*, London, Academic Press, 1978, 213-222, each of which is incorporated by reference in its entirety.

$$\sin(\alpha) = \frac{\gamma_{lv}}{mg} w(\cos\theta_{rec} - \cos\theta_{adv}) \quad (1)$$

where m is the mass of the drop, g is the gravitational constant, $\gamma_{lv}$ is the liquid-vapor surface tension of the liquid, and w is the width of the drop perpendicular to the drop sliding direction. The sliding angle α clearly depends on the dimensionless contact angle hysteresis (CAH) in the form (cos $\theta_{rec}$–cos $\theta_{adv}$), not on a single contact angle value. This hysteresis term is not, however, the only parameter in Equation 1 that is sensitive to the liquid contact angles; the drop width w also varies with liquid contact angles and may be estimated using the expression:

$$w \approx 2\left(\frac{3V}{\pi}\right)^{1/3} \frac{\sin\bar{\theta}}{(2-3\cos\bar{\theta}+\cos^3\bar{\theta})^{1/3}} \quad (2)$$

where V is the drop volume and $\bar{\theta}$ is a cosine-averaged apparent contact angle that can be computed from the expression $$\cos\bar{\theta} = \frac{1}{2}(\cos\theta_{adv} + \cos\theta_{rec}).$$

Figure 2:
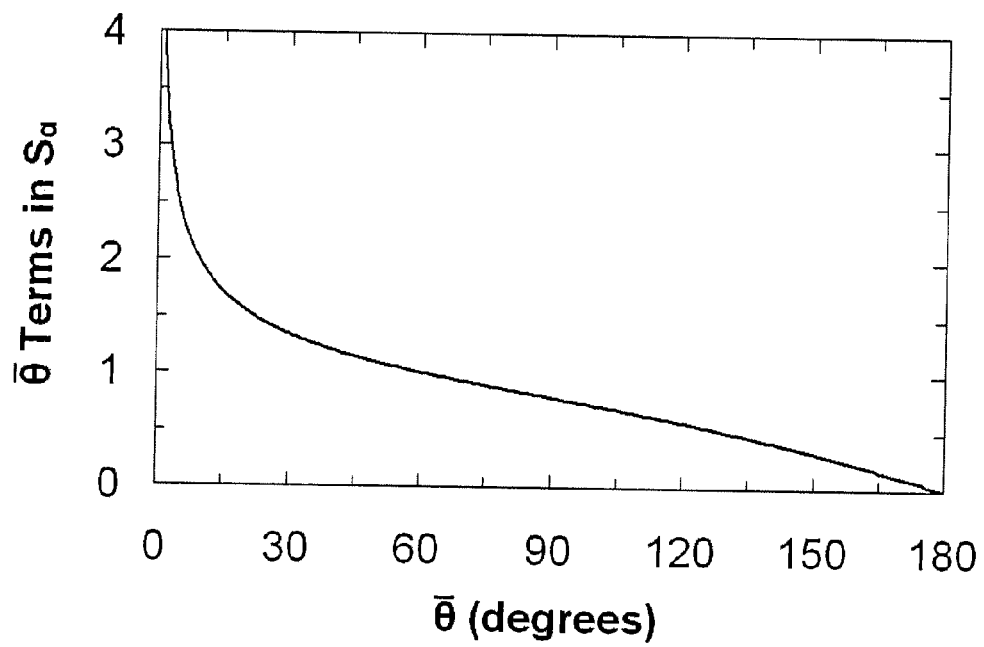
FIG. 2 is a plot of term in $S_a$ that contain $\overline{\theta}$ and influence the drop width w (i.e., $$\frac{\sin\overline{\theta}}{(2 - 3\cos\overline{\theta} + \cos^3\overline{\theta})^{1/3}})$$

See, for example, W. Choi, et al. *J. Colloid Interface Sci.*, 2009, 339, 208-216, which is incorporated by reference in its entirety. Defining density as ρ=m/V and substituting the expression for w from Equation 2 into Equation 1 yields:

$$\sin(\alpha) \approx \frac{2\gamma_{lv}}{\rho g}\left(\frac{3}{\pi V^2}\right)^{1/3} \frac{\sin\bar{\theta}(\cos\theta_{rec}-\cos\theta_{adv})}{(2-3\cos\bar{\theta}+\cos^3\bar{\theta})^{1/3}} = \frac{2\gamma_{lv}}{\rho g}\left(\frac{3}{\pi V^2}\right)^{1/3} S_\alpha \quad (3)$$

where the drop sliding scaling factor $S_\alpha$ contains all of the contact angle dependencies (i.e., those that are functions of the liquid-surface interactions) of the sliding angle α. Sessile drops of a given size and surface tension will slide at the lowest tilt angle α on surfaces characterized by small values of $S_\alpha$. This factor $S_\alpha$ is primarily sensitive to contact angle hysteresis in the form (cos $\theta_{rec}$–cos $\theta_{adv}$) but also contains some dependency on the absolute magnitudes of $\theta_{adv}$ and $\theta_{rec}$ due to the influence of $\bar{\theta}$ on the drop width w. The sensitivity of the sliding angle α to the mean contact angle $\bar{\theta}$ reflects the fact that, all else equal, liquids characterized by higher magnitude contact angles will form narrower cross-section drops that slide more readily than the flatter sessile drops formed by liquids with smaller contact angles and larger contact areas. Quantitatively, these $\bar{\theta}$-containing terms modify the hysteresis dependency (cos $\theta_{rec}$–cos $\theta_{adv}$) by a numerical factor that is generally between 3 ($\bar{\theta}\approx 3°$) and 0.1 ($\bar{\theta}\approx 170°$. See, for example, W. Choi, et al. *J. Colloid Interface Sci.*, 2009, 339, 208-216, which is incorporated by reference in its entirety. FIG. 2 shows a complete plot of this functional dependence as $\bar{\theta}$ varies.

A second method to physically remove a sessile liquid drop is to pull the drop vertically off of a substrate. Such a process is often analyzed using thermodynamic work arguments to account for the individual free energy changes associated with the pairwise formation and elimination of specific interfaces. The Young-Dupré equation is commonly used to calculate the equilibrium work of adhesion ($W_e$) which is defined as the reversible free energy associated with the creation and destruction of interfaces:

$$W_e = \gamma_{lv}(1+\cos\theta_e) \quad (4)$$

where $\theta_e$ is the equilibrium (Young's) contact angle. See, for example, T. Young, *Philos. Trans. R. Soc. London*, 1805, 95, 65; A. Dupre, *Theorie Mecanique de la Chaleur*, Paris, Gauthier-Villars, 1869; J. C. Berg, *Surfactant Sci. Ser.* 1993, 49, 75-148; and P. C. Hiemenz and R. Rajagopalan, *Principles of Colloid and Surface Chemistry*, New York, Marcel Dekker, 1997, each of which is incorporated by reference in its entirety. There are several drawbacks to estimating the solid surface energy $W_e$ using equilibrium (Young's) contact angle $\theta_e$. Firstly, $\theta_e$ is difficult to measure and, perhaps more importantly, $\theta_e$ and, by extension, $\gamma_{sv}$ do not typically correlate well with the actual work required to remove liquid drops from substrates. See, for example, A. Marmur, *Soft Matter*, 2006, 2, 12-17 and A. Marmur, *Annu. Rev. Mater. Res.*, 2009, 39, 473-489, each of which is incorporated by reference in its entirety. For example, the forces required to remove Wilhelmy plates from liquids or to separate surfaces connected by a capillary bridge of water are dependent on the receding contact angle $\theta_{rec}$ and not the equilibrium contact angle $\theta_e$. It has been suggested that the practical work of adhesion $W_p$ that corresponds to the actual work required to separate a liquid from a surface could be calculated using a modified version of Equation 4 that replaces $\theta_e$ with the receding contact angle $\theta_{rec}$:

$$W_p = \gamma_{lv}(1+\cos\theta_{rec}) \quad (5)$$

See, for example, E. J. de Souza, et al. *Langmuir*, 2008, 24, 1391-1396 and K. L. Mittal, In *Adhesion Measurement of Thin Films, Thick Films and Bulk Coatings*, Philadelphia, Pa., ASTM Special Tech. Publ. 640, 1976, each of which is incorporated by reference in its entirety.

The practical work required to remove a liquid drop from a surface is minimized when $\theta_{rec}$ is maximized, and is not related explicitly to the idealized value of the equilibrium contact angle $\theta_e$.

An alternative approach to using measurements of $\theta_e$ to estimate $\gamma_{sv}$ is to utilize measurements of the advancing and receding contact angles $\theta_{adv}$ and $\theta_{rec}$ to calculate an "advancing surface energy" $\gamma_{sv,a}$ and a "receding surface energy" $\gamma_{sv,r}$ for a test sample. See, for example, C. Della Volpe and S. Siboni, *J. Colloid Interface Sci.*, 1997, 195, 121-136, which has been incorporated by reference in its entirety. Advantageously, measurements of both $\theta_{adv}$ and $\theta_{rec}$, unlike those of $\theta_e$, are readily reproducible and, furthermore, are reliable predictors of the propensity for drop sliding described in Equation 3 or the ease of drop pull-off summarized in Equation 5. This advancing/receding surface energy approach is not derived from any fundamental theory, but can yield quantifiable and repeatable parameters that provide an empirical characterization of the liquid repellency (or, conversely, wettability) of a smooth substrate with a given surface chemistry.

Semiempirical models of solid surface energy that are commonly fit to contact angle data include those previously developed. See, for example, D. K. Owens and R. C. Wendt, *J. Appl. Polym. Sci.*, 1969, 13, 1741-1747; L. A. Girifalco and R. J. Good, *J. Phys. Chem.*, 1957, 61, 904-909; R. J. Good, *J. Colloid Interface Sci.*, 1977, 59, 398-419; C. J. Van Oss, R. J. Good, and M. K. Chaudhury, *Langmuir*, 1988, 4, 884-891; C. J. Van Oss, M. K. Chaudhury, and R. J. Good, *Chem. Rev.*, 1988, 88, 927-941; and R. J. Good, *J. Adhes. Sci. Technol.*, 1992, 6, 1269-1302, each of which is incorporated by reference in its entirety.

According to the Girifalco-Good model, the total surface energy of either a solid ($\gamma_{sv}$) or a liquid ($\gamma_{lv}$) is the sum of the dispersion (or nonpolar, $\gamma^d$) and polar ($\gamma^p$) contributions. The polar portion can be further subdivided into hydrogen bond donating (or acidic, $\gamma^+$) and hydrogen bond accepting (or basic, $\gamma^-$) components:

$$\gamma_{lv} = \gamma_{lv}^d + \gamma_{lv}^p = \gamma_{lv}^d + 2\sqrt{\gamma_{lv}^+ \gamma_{lv}^-}$$

$$\gamma_{sv} = \gamma_{sv}^d + \gamma_{sv}^p = \gamma_{sv}^d + 2\sqrt{\gamma_{sv}^+ \gamma_{sv}^-} \quad (6)$$

The surface energy components of many probe liquids are known based on water as a standard state with $\gamma_{lv}^+ = \gamma_{lv}^- = 25.5$ mN/m and some of these values are provided in Table 1. See, for example, M. K. Chaudhury, *Mater. Sci. Eng. R*, 1996, 16, 97-159, which has been incorporated by reference in its entirety.

TABLE 1

Values of total ($\gamma_{lv}$), dispersion ($\gamma_{lv}^d$), polar ($\gamma_{lv}^p$), hydrogen bond donating ($\gamma_{lv}^+$), and hydrogen bond accepting ($\gamma_{lv}^-$) surface energies in mN/m

| Liquid | $\gamma_{lv}$ | $\gamma_{lv}^d$ | $\gamma_{lv}^p$ | $\gamma_{lv}^+$ | $\gamma_{lv}^-$ |
|---|---|---|---|---|---|
| Water | 72.1 | 21.1 | 51.0 | 25.5 | 25.5 |
| Ethylene Glycol | 47.7 | 28.7 | 19.0 | 1.9 | 47.0 |
| Dimethyl Sulfoxide | 44.0 | 36.0 | 8.0 | 0.5 | 32.0 |
| Diiodomethane | 50.8 | 50.8 | 0.0 | 0.0 | 0.0 |
| Rapeseed Oil | 35.5 | 35.5 | 0.0 | 0.0 | 0.0 |
| Hexadecane | 27.8 | 27.8 | 0.0 | 0.0 | 0.0 |

The expressions provided in Equation 6 can be combined with Equation 5 (either as written, or with $\theta_{adv}$ substituted for $\theta_{rec}$) to yield expressions for the advancing and practical works of adhesion $W_a$ and $W_p$:

$$W_a = \gamma_{lv}(1+\cos\theta_{adv}) = 2(\sqrt{\gamma_{sv,a}^d \gamma_{lv}^d} + \sqrt{\gamma_{sv,a}^+ \gamma_{lv}^-} + \sqrt{\gamma_{lv}^+ \gamma_{sv,a}^-})$$

$$W_p = \gamma_{lv}(1+\cos\theta_{rec}) = 2(\sqrt{\gamma_{sv,r}^d \gamma_{lv}^d} + \sqrt{\gamma_{sv,r}^+ \gamma_{lv}^-} + \sqrt{\gamma_{lv}^+ \gamma_{sv,r}^-}) \quad (7)$$

Note that all of the energetic terms in these expressions are cross products between the solid and liquid parameters. See, for example, J. C. Berg, *Surfactant Sci. Ser* 1993, 49, 75-148, which is incorporated by reference in its entirety. The unknown quantities $\gamma_{sv,i}^d$, $\gamma_{sv,i}^+$, and $\gamma_{sv,i}^-$ can be calculated from measurements of the advancing or receding contact angles of three contacting liquids and the following linear system of equations:

$$2\begin{bmatrix} \sqrt{\gamma_{lv,i,1}^d} & \sqrt{\gamma_{lv,i,1}^-} & \sqrt{\gamma_{lv,i,1}^+} \\ \sqrt{\gamma_{lv,i,2}^d} & \sqrt{\gamma_{lv,i,2}^-} & \sqrt{\gamma_{lv,i,2}^+} \\ \sqrt{\gamma_{lv,i,3}^d} & \sqrt{\gamma_{lv,i,3}^-} & \sqrt{\gamma_{lv,i,3}^+} \end{bmatrix} \begin{bmatrix} \sqrt{\gamma_{sv,i}^d} \\ \sqrt{\gamma_{sv,i}^+} \\ \sqrt{\gamma_{sv,i}^-} \end{bmatrix} = \begin{bmatrix} \gamma_{lv,i,1}(1+\cos\theta_{i,1}) \\ \gamma_{lv,i,2}(1+\cos\theta_{i,2}) \\ \gamma_{lv,i,3}(1+\cos\theta_{i,3}) \end{bmatrix} \quad (8)$$

This protocol was previously used to characterize spin-cast surfaces of fluorodecyl POSS, which has an advancing surface energy $\gamma_{sv,a} = 9.5 \pm 1.5$ mN/m and a receding surface energy $\gamma_{sv,r} = 16.3 \pm 2.4$ mN/m.

These low values of $\gamma_{sv,a}$ and $\gamma_{sv,r}$ indicate that fluorodecyl POSS interacts weakly with contacting liquids, and is a strongly "liquid repellent" material with respect to both the sliding and pull-off mechanisms summarized in Equations 3 and 5, respectively. Despite these unusually low surface energy values (particularly $\gamma_{sv,r}$), there are several drawbacks to employing pure fluorodecyl POSS as a liquid repellent coating. First, the morphology of films composed of crystalline POSS molecules is sensitive to the deposition conditions, with both smooth and rough coatings being reported in the literature. See, for example, A. Tuteja, et al. *Science*, 2007, 318, 1618-1622, which has been incorporated by reference in its entirety. For fully-wetted Wenzel state droplets, increases in surface roughness generally lead to decreases in receding liquid contact angles and a concomitant increase in adhesion to the substrate, a detrimental result if maximum liquid repellency is desired. Pure POSS films may also contain crystallites that are large enough to scatter light and reduce optical transparency, a drawback for numerous applications. Additionally, the weak intermolecular interactions that make fluorodecyl POSS coatings liquid repellent also reduce the adhesion of deposited fluorodecyl POSS films to underlying substrates, limiting their abrasion resistance and durability in coatings applications. Finally, POSS molecules are generally more expensive than alternative materials such as polymers, and minimizing the amount of fluorodecyl POSS that must be applied to a substrate to impart maximum liquid repellency is beneficial.

The POSS molecules may be used as surface-modifying additives in blends with polymers. The POSS molecules in such blends may bloom to the composite/air interface in order to lower the system free energy, imparting the composite material with at least some of the liquid repellency characteristics of the POSS component. See, for example, S. Turri and M. Levi, *Macromol. Rapid Commun.*, 2005, 26, 1233-1236, which has been incorporated by reference in its entirety. Researchers pursuing this strategy have reported increases in liquid contact angles by adding various types of POSS molecules to polyurethanes, nylon 6, polycarbonate, poly(methyl methacrylate), poly(ethyl methacrylate), polypropylene, epoxy thermosets, poly(chlorotrifluoroethylene), fluoropolymer resin, perfluorocyclobutyl aryl ether polymers, and the commercial fluoropolymer Tecnoflon BR9151. See, for example, R. Misra, et al. *J. Polym. Sci., Part B: Polym. Phys.*, 2009, 47, 1088-1102; P. F. Rios, et al. *J. Adhes. Sci. Technol.*, 2006, 20, 563-587; K. Koh, et al. *Macromolecules*, 2005, 38, 1264-1270; J. W. Xu, et al. *J. Mater. Chem.*, 2009, 19, 4740-4745; F. Mammeri, et al. *Chem. Mater.*, 2009, 21, 4163-4171; A. Tuteja, et al. *MRS Bull.*, 2008, 33, 752-758; L. Z. Dai, et al. *Sci. China Chem.*, 2010, 53, 2000-2005; A. J. Meuler, et al. *ACS Appl. Mater. Interfaces*, 2010, 2, 3100-3110; R. Misra, et al. *J. Polym. Sci. Part B: Polym. Phys.*, 2007, 45, 2441-2455; K. Zeng and S. Zheng, *J. Phys. Chem. B*, 2007, 111, 13919-13928; J. M. Mabry, et al. In *ACS Symposium Series* 964; S. Clarson, et al. Eds.; Washington, D.C., American Chemical Society, 2007, 290-300; I. Jerman, et al. *Sol. Energy Mater. Sol. Cells*, 2010, 94, 232-245; S. T. Iacono, et al. *Macromolecules*, 2007, 40, 9517-9522; and S. T. Iacono, et al. *Polymer*, 2007, 48, 4637-4645, each of which is incorporated by reference in its entirety.

Blends of fluorodecyl POSS with the fluoropolymer Tecnoflon BR9151 and three polymethacrylates with a broad range of glass transition temperatures: poly(methyl methacrylate) (PMMA, $T_g$=124° C.), poly(ethyl methacrylate) (PEMA, $T_g$=77° C.), and poly(butyl methacrylate) (PBMA, $T_g$=18° C.) were observed. These polymers are attractive candidates as matrix materials for polymer/fluorodecyl POSS composites because they all readily dissolve in a fluorinated solvent (Asahiklin AK225) along with the fluorodecyl POSS. The molecular structures of these four polymers are provided in FIG. 3. The advancing and receding contact angles of water, ethylene glycol, dimethyl sulfoxide, diiodomethane, rapeseed oil, and hexadecane were measured goniometrically on all of the test surfaces and these values were then used to evaluate advancing and receding surface energy values of polymer/fluorodecyl POSS blends within the context of the Girifalco-Good framework. The lowest surface energy values and maximum liquid repellencies are attained in PEMA or PMMA blends containing as little as 20 wt % fluorodecyl POSS. Furthermore, these composite coatings are readily deposited as smooth, optically transparent films that adhere strongly to underlying substrates.

EXAMPLES

Materials

Asahiklin (AK225, Asahi Glass Company), ethylene glycol (99%, Aldrich), dimethyl sulfoxide (99%, Aldrich), diiodomethane (99%, Aldrich), rapeseed oil (Fluka), and hexadecane (99%, Aldrich) were used as received. Deionized water (18 MΩ-cm) was purified using a Millipore system. Tecnoflon BR9151 (Solvay Solexis), PMMA (Scientific Polymer Products, $M_w$=540 kg/mol), PEMA (Aldrich, $M_w$=515 kg/mol), PBMA (Aldrich, $M_w$=337 kg/mol), Polycarbonate (PC, Bayer), 1H,1H,2H,2H-perfluorodecyltrichlorosilane (Aldrich), and Teflon AF-2400 solution (DuPont, item number 400S2-100-1) were used as received. Many different fluoropolymers are marketed under the "Teflon" name. The amorphous Teflon AF-2400 is characterized by higher $\theta_{adv}$ and $\theta_{rec}$ and thus lower $\gamma_{sv,a}$ and $\gamma_{sv,r}$ than most other Teflon materials, making it a minimum surface energy benchmark for Teflon. See, for example, L. C. Gao and T. J. McCarthy, *Langmuir*, 2008, 24, 9183-9188 and S. Lee, J. S. Park, and T. R. Lee, *Langmuir*, 2008, 24, 4817-4826, each of which is incorporated by reference in its entirety. Fluorodecyl POSS was prepared following established protocols.

Differential Scanning Calorimetry (DSC)

Calorimetry experiments were conducted using a TA Instruments Q1000 DSC. Approximately 5 mg of each polymer was placed into an aluminum pan, heated at 10° C./min to 180° C., cooled at 10° C./min to −80° C., and heated again at 10° C./min to 180° C. Data were acquired during the second heating cycle.

Coating Methodology

Polymer/fluorodecyl POSS solutions (total solids 20 mg/mL) were prepared by dissolving polymers and/or fluorodecyl POSS in Asahiklin. Dichloromethane was used to prepare the PC solution because PC is not soluble in Asahiklin. Approximately 200-300 nm thick coatings of test materials were deposited at room temperature on silicon wafers via a spin coating process; approximately 0.5 mL of solution was placed on top of each silicon wafer (~4 cm²) and the wafer was spun at 900 rpm for 30 seconds.

Amorphous Teflon AF-2400 was deposited onto a silicon wafer by: (i) placing ~0.5 mL of solution on top of a silicon wafer (~4 cm²) and spinning the wafer at 900 rpm for 30 seconds; (ii) heating the film overnight at ~250° C. to evaporate the low-volatility fluorinated solvent.

Silicon wafers were treated with 1H,1H,2H,2H-perfluorodecyltrichlorosilane by: (i) placing them, along with a few drops of the reactive fluoroalkylsilane liquid, inside a Teflon canister under an inert nitrogen atmosphere; (ii) sealing the canister and heating it overnight at 150° C.

Surface Characterization

Scanning electron microscopy (SEM) images were acquired using a JEOL 6060 instrument operating at an acceleration voltage of 5 kV. Specimens were sputter coated with ~2 nm of platinum prior to imaging. Atomic force microscopy (AFM) measurements were carried out using a Dimension 3100 instrument (Veeco Metrology Group) operating in the tapping mode. X-ray photoelectron spectroscopy (XPS) was performed using a Kratos Axis Ultra X-ray photoelectron spectrometer manufactured by Kratos Analytical (Manchester, England). The monochromatized Al Kα source was operated at 15 kV and 10 mA (150 W) and emissions were collected at takeoff vectors orthogonal to the sample surface.

Contact Angle Measurements

Contact angles of probe fluids on test surfaces were measured using a VCA2000 goniometer (AST Inc.). Advancing ($\theta_{adv}$) and receding ($\theta_{rec}$) angles were measured as probe fluid was supplied via a syringe into or out of sessile droplets (drop volume ~5 µL). Measurements were taken at four different spots on each film, and the reported uncertainties are standard deviations associated with these eight contact angle values (a left-side and right-side measurement for each drop).

Methodology for Computing Surface Energy Values

While in principle the matrix presented in Equation 8 is solvable using the advancing and receding contact angles of just three liquids, small uncertainties in the measured contact angles associated with the vector on the right hand side may yield large differences in the computed surface energy parameters when the system is mathematically ill-conditioned. See, for example, S. Lee, et al. *Langmuir*, 2008, 24, 4817-4826; C. Della Volpe, et al. *J. Adhes. Sci. Technol.*, 1998, 12, 1141-1180; and T. Bialopiotrowicz, *J. Adhes. Sci. Technol.*, 2009, 23, 799-813, each of which is incorporated by reference in its entirety. The impact of outlying data points was reduced and the uncertainty minimized by using the contact angle measurements from all six probe liquids on each of the test surfaces. Having six data points and just three unknowns yields an overdetermined set of equations that can be "solved" according to a least squares criterion. However, the three nonpolar liquids have only dispersion interactions (i.e., $\gamma_{lv}^+ = \gamma_{lv}^- = 0$), which makes the problem ill-conditioned. The matrix inversion process for this multicollinear system introduces significant uncertainty into the computed surface energy parameters if they are obtained from a simultaneous least squares fit of all of the experimental data. See, for example, T. Bialopiotrowicz, *J. Adhes. Sci. Technol.*, 2009, 23, 815-825, which is incorporated by reference in its entirety. Instead of considering simultaneously all of the data, an alternative two-step approach can be used: (1) calculate the dispersion component of the solid surface energy $\gamma_{sv,i}^d$ from the measured nonpolar liquid contact angles; (2) determine least squares fits of $\gamma_{sv,i}^+$ and $\gamma_{sv,i}^-$ from this computed and the measured polar liquid contact angles. See, for example, R. J. Good, and C. J. Van Oss, In *Modern Approaches to Wettability: Theory and Applications*; M. Schrader and G. Loeb, Eds.; New York, Plenum, 1992, 1-27, which is incorporated by reference in its entirety. Such an approach advantageously circumvents the issues with multicollinearity error, incorporates information from all six liquids to minimize the impact of any one outlying data point, and ultimately yields meaningful values of $\gamma_{sv,i}^d$, $\gamma_{sv,i}^+$, and $\gamma_{sv,i}^-$.

Coating Adhesion Testing

The adhesion of deposited films to the underlying silicon wafers was probed by using a commercially available cross-cut test kit (BYK Gardner, Cat. No. 5123) to follow an ASTM standard testing protocol. See, for example, ASTM Standard D3359-09, Test Methods for Measuring Adhesion by Tape Test, ASTM International, 2010, which has been incorporated by reference in its entirety. Briefly, the supplier-provided flexible cutter was used to create a lattice pattern of cuts in each test film. These lattices consisted of eleven cuts, spaced 1 mm apart, that were made in two perpendicular directions. A piece of 25 mm wide semitransparent pressure sensitive tape (Permacel P99) was placed over the grid of cuts and rapidly peeled off of the surface at an angle of 180°. The coating was visually inspected and classified between 0B (worst adhesion) and 5B (best adhesion) according to ASTM standards.

Results and Discussion

Liquid contact angles are sensitive to the roughness of a surface, and the well-known Wenzel equation describes the effects of roughness on the most stable apparent contact angle $\theta^*$ exhibited by fully wetted liquid droplets:

$$\cos \theta^* = r \cos \theta \qquad (6)$$

where the Wenzel roughness r is defined as the ratio of actual surface area to projected surface area and $\theta$ is the most stable apparent contact angle on a chemically equivalent smooth surface. See, for example, H. Kamusewitz, et al. *Colloids Surf. A*, 1999, 156, 271-279; G. Wolansky and A. Marmur, *Colloids Surf. A*, 1999, 156, 381-388; and A. Marmur and E. Bittoun, *Langmuir*, 2009, 25, 1277-1281, each of which has been incorporated by reference in its entirety. The most stable apparent contact angle $\theta^*$ has been shown to increase with roughness when $\theta$ is above 90°, and decrease with increasing roughness when $\theta$ is below 90°. The roughness-induced increase in $\theta^*$ when $\theta$ exceeds 90° does not, however, correlate with increased liquid repellency of fully wetted Wenzel-state droplets, because the apparent receding contact angle $\theta_{rec}^*$ generally decreases with increasing roughness regardless of whether $\theta_{rec}$ measured on a smooth surface is above or below the 90° threshold. This roughness-induced decrease in $\theta_{rec}^*$ leads to an increased resistance to both drop pull-off (Equation 5) and also to drop sliding when coupled with the roughness-induced increase in the apparent advancing contact angle $\theta_{adv}^*$ (Equation 3). Thus, $\theta_{rec}^*$ of fully-wetted droplets and the liquid repellency of Wenzel surfaces are maximized when the roughness of a substrate is minimized.

The morphology and roughness of fluorodecyl POSS films prepared in this work varied in the same way as others previously described in the literature, with both smooth and rough topographies resulting from the same deposition protocol of spin coating a 20 mg/mL solution at 900 rpm for 30 sec. For example, one prepared "rough" fluorodecyl POSS film is characterized by water contact angles of $\theta_{adv} = 134°$ and $\theta_{rec} = 106°$ and a root-mean square roughness $R_q = 86$ nm while a "smooth" fluorodecyl POSS sample exhibits water contact angles of $\theta_{adv} = 125°$ and $\theta_{rec} = 112°$ and $R_q = 5.9$ nm. A scanning electron micrograph of the rough fluorodecyl POSS film is provided in FIG. 4A. These variations may arise from interactions between the rate of solvent evaporation and the rate of fluorodecyl POSS crystallization as environmental variables such as temperature and relative humidity fluctuate. Blends comprising polymers and fluorodecyl POSS, in contrast, were consistently and reproducibly deposited as smooth films, and a representative scanning electron micrograph of an 80/20 PMMA/fluorodecyl POSS sample with water $\theta_{adv} = 124°$ and $\theta_{rec} = 118°$ and $R_q = 2.6$ nm is provided in FIG. 4B. Similarly smooth spin-coated films were obtained all of the tested blends of fluorodecyl POSS and Tecnoflon, PMMA, PEMA, or PBMA. Promoting the deposition of smooth coatings is crucial for maximizing the receding contact angles of liquid drops and facilitating their removal from substrates by either the sliding (Equation 3) or pull-off mechanism (Equation 5) because receding contact angle, unlike advancing and most stable apparent contact angles, decreases with roughness even when $\theta_{rec}$ measured on a smooth surface is above 90°. See, for example, A. Marmur, *Soft Matter*, 2006, 2, 12-17; R. E. Johnson, Jr. and R. H. Dettre, *Surfactant Sci. Ser.*, 1993, 49, 1-73; E. Wolfram and R. Faust, In *Wetting, Spreading, and Adhesion*, London, Academic Press, 1978, 213-222; H. Kamusewitz, W. Possart, and D. Paul, *Colloid Surf. A-Physicochem. Eng. Asp.*, 1999, 156, 271-279; and S. Kirk, et al. *Plasma Process. Polym.*, 2010, 7, 107-122, each of which is incorporated by reference in its entirety.

Figure 5:
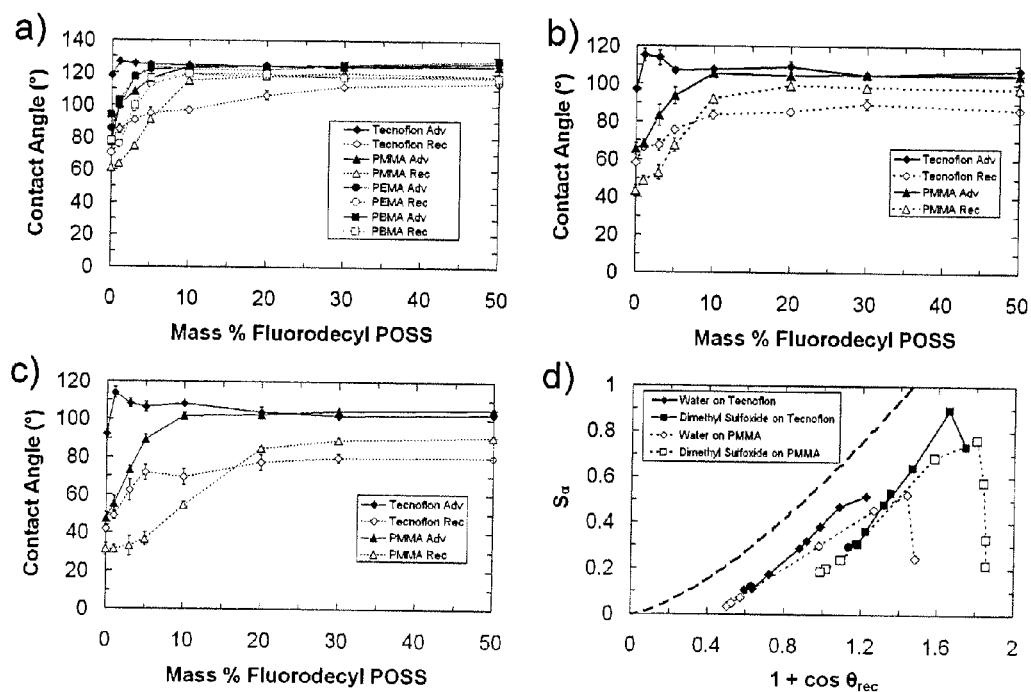

Incorporating polymeric binders to minimize the roughness of fluorodecyl POSS-containing films will maximize liquid repellency only if the chemical moieties located at or near the surface of the composite coating are those of the fluorodecyl POSS molecules, and not those of the higher energy polymers. Measurements of the advancing and receding contact angles of the bifunctional polar ($\gamma_{lv}^+, \gamma_{lv}^- > 0$) liquids water, ethylene glycol, and dimethyl sulfoxide, as well as the nonpolar ($\gamma_{lv}^- = \gamma_{lv}^+ = 0$) liquids diiodomethane, rapeseed oil, and hexadecane, provide a direct evaluation of the liquid wettability and an indirect probe of the surface composition of the polymer/fluorodecyl POSS blends. Representative data that illustrate key trends are presented in FIGS. 5-6, and the complete set of advancing and receding contact angle measurements on the polymer/fluorodecyl POSS blends, polycarbonate, Teflon AF-2400, and 1H,1H, 2H,2H-perfluorodecyltrichlorosilane are provided in Tables 2 and 3. The lines connecting the data points on all plots are intended to guide the eye. In FIG. 5A, the solid symbols connote $\theta_{adv}$ and the hollow symbols denote $\theta_{rec}$. In FIG. 5B, the solid symbols indicate $\theta_{adv}$ and the hollow symbols connote $\theta_{rec}$. In FIG. 5C, the solid and hollow symbols denote $\theta_{adv}$ and $\theta_{rec}$, respectively. In FIG. 5D, the dashed line represents $\theta_{adv} = 180°$ and the area above and to the left of this curve is not accessible because it is impossible for $\theta_{rec} > \theta_{adv}$. The lines between data points connect the individual measurements, from right to left, in order of increasing fluorodecyl POSS loadings: 0-1-3-5-10-20-30-50 wt %. The red circles indicate measurements for the pure fluorodecyl POSS coating.

TABLE 2

Measured advancing contact angles $\theta_{adv}$ of six probe liquids on the 36 test surfaces[a]

| Sample | Water | Ethylene Glycol | Dimethyl Sulfoxide | Diiodo-methane | Rapeseed Oil | Hexadecane |
|---|---|---|---|---|---|---|
| PC | 87.2 ± 1.3 | 75.7 ± 3.8 | 60.5 ± 6.0 | 40.8 ± 4.1 | 44.2 ± 6.2 | 24.0 ± 6.7 |
| Fluoroalkylsilane[b] | 123.0 ± 1.9 | 101.7 ± 1.5 | 109.8 ± 0.6 | 106.6 ± 2.4 | 84.2 ± 2.0 | 78.4 ± 3.1 |
| Teflon AF-2400 | 125.4 ± 1.1 | 103.5 ± 1.1 | 101.3 ± 1.1 | 104.4 ± 1.7 | 82.3 ± 2.5 | 69.7 ± 2.1 |
| PMMA | 77.3 ± 1.3 | 65.4 ± 3.0 | 47.5 ± 3.2 | 45.8 ± 1.9 | 29.7 ± 6.5 | 16.1 ± 3.0 |
| 99/1 PMMA/Fluorodecyl POSS | 100.4 ± 3.1 | 68.3 ± 2.1 | 55.3 ± 3.9 | 64.9 ± 5.4 | 38.9 ± 5.8 | 41.5 ± 2.5 |
| 97/3 PMMA/Fluorodecyl POSS | 108.6 ± 0.5 | 83.3 ± 5.6 | 73.2 ± 1.7 | 93.4 ± 2.1 | 71.1 ± 4.1 | 61.3 ± 4.5 |
| 95/5 PMMA/Fluorodecyl POSS | 116.6 ± 1.2 | 93.6 ± 4.4 | 89.3 ± 2.3 | 94.6 ± 3.8 | 69.9 ± 6.1 | 66.4 ± 7.4 |
| 90/10 PMMA/Fluorodecyl POSS | 123.5 ± 1.0 | 105.5 ± 0.4 | 102.0 ± 1.2 | 102.3 ± 1.4 | 83.6 ± 3.2 | 79.8 ± 1.9 |
| 80/20 PMMA/Fluorodecyl POSS | 123.9 ± 0.3 | 104.5 ± 0.5 | 102.5 ± 0.8 | 102.5 ± 1.4 | 86.6 ± 1.2 | 79.9 ± 1.5 |
| 70/30 PMMA/Fluorodecyl POSS | 124.0 ± 0.4 | 105.0 ± 1.1 | 104.4 ± 0.4 | 103.6 ± 0.8 | 87.3 ± 1.4 | 79.0 ± 0.6 |
| 50/50 PMMA/Fluorodecyl POSS | 124.2 ± 1.1 | 104.7 ± 1.4 | 105.4 ± 0.9 | 104.8 ± 1.5 | 87.5 ± 2.2 | 79.4 ± 1.6 |
| PEMA | 85.5 ± 1.4 | 65.3 ± 2.6 | 54.1 ± 2.4 | 57.4 ± 2.8 | 38.3 ± 1.7 | 16.6 ± 2.8 |
| 99/1 PEMA/Fluorodecyl POSS | 99.7 ± 1.5 | 71.8 ± 6.0 | 69.8 ± 1.8 | 70.6 ± 2.0 | 53.0 ± 2.9 | 47.5 ± 1.2 |
| 97/3 PEMA/Fluorodecyl POSS | 117.3 ± 0.8 | 92.9 ± 6.1 | 94.0 ± 1.5 | 85.7 ± 6.3 | 81.4 ± 0.7 | 75.4 ± 0.9 |
| 95/5 PEMA/Fluorodecyl POSS | 122.0 ± 0.6 | 102.8 ± 3.8 | 101.5 ± 1.7 | 98.5 ± 4.9 | 81.9 ± 2.8 | 80.6 ± 1.1 |
| 90/10 PEMA/Fluorodecyl POSS | 123.1 ± 0.4 | 107.3 ± 1.3 | 102.1 ± 1.0 | 102.4 ± 0.7 | 85.5 ± 1.7 | 79.5 ± 0.9 |
| 80/20 PEMA/Fluorodecyl POSS | 124.3 ± 0.5 | 104.6 ± 1.6 | 103.0 ± 1.0 | 103.2 ± 0.8 | 85.7 ± 3.4 | 79.6 ± 1.4 |
| 70/30 PEMA/Fluorodecyl POSS | 124.7 ± 0.4 | 104.5 ± 1.8 | 102.5 ± 1.2 | 103.4 ± 0.8 | 86.5 ± 1.9 | 77.1 ± 1.8 |
| 50/50 PEMA/Fluorodecyl POSS | 126.4 ± 0.5 | 106.1 ± 1.2 | 106.0 ± 0.6 | 104.2 ± 2.1 | 87.1 ± 1.8 | 79.3 ± 1.2 |
| PBMA | 93.7 ± 0.9 | 71.5 ± 2.1 | 69.5 ± 1.6 | 70.8 ± 5.5 | 41.8 ± 1.7 | 22.1 ± 3.0 |
| 99/1 PBMA/Fluorodecyl POSS | 103.0 ± 2.1 | 75.4 ± 2.1 | 71.6 ± 1.6 | 97.3 ± 3.6 | 49.1 ± 4.9 | 41.5 ± 1.0 |
| 97/3 PBMA/Fluorodecyl POSS | 117.2 ± 1.0 | 95.9 ± 1.5 | 94.7 ± 1.3 | c | 63.2 ± 3.8 | 60.9 ± 3.9 |
| 95/5 PBMA/Fluorodecyl POSS | 123.5 ± 0.4 | 102.4 ± 2.2 | 102.6 ± 0.7 | c | 81.8 ± 2.1 | 76.5 ± 2.8 |

[a]Reported uncertainties are standard deviations from eight measured contact angle values.
[b]1H,1H,2H,2H-perfluorodecyltrichlorosilane.
c Measurement of angles was difficult because drops do not advance smoothly. See FIG. 7 for details.

TABLE 3

Measured receding contact angles $\theta_{rec}$ of various probe liquids on the 36 test surfaces[a]

| Sample | Water | Ethylene Glycol | Dimethyl Sulfoxide | Diiodo-methane | Rapeseed Oil | Hexadecane |
|---|---|---|---|---|---|---|
| PC | 72.3 ± 1.2 | 46.9 ± 4.1 | 30.1 ± 3.5 | 15.3 ± 1.9 | 21.3 ± 2.0 | <10 |
| Fluoroalkylsilane[b] | 93.0 ± 3.1 | 74.5 ± 3.6 | 66.2 ± 1.4 | 73.2 ± 2.7 | 48.9 ± 3.5 | 53.1 ± 2.1 |

TABLE 3-continued

Measured receding contact angles $\theta_{rec}$ of various probe liquids on the 36 test surfaces[a]

| Sample | Water | Ethylene Glycol | Dimethyl Sulfoxide | Diiodomethane | Rapeseed Oil | Hexadecane |
|---|---|---|---|---|---|---|
| Teflon AF-2400 | 113.4 ± 0.8 | 93.9 ± 2.2 | 89.3 ± 1.0 | 88.4 ± 2.3 | 58.6 ± 3.7 | 58.1 ± 2.8 |
| PMMA | 61.2 ± 1.4 | 43.0 ± 3.0 | 31.2 ± 3.0 | 22.2 ± 1.3 | 15.3 ± 2.3 | <10 |
| 99/1 PMMA/Fluorodecyl POSS | 63.9 ± 1.0 | 48.7 ± 2.0 | 31.3 ± 2.1 | 23.5 ± 3.3 | 15.8 ± 1.3 | 16.1 ± 2.3 |
| 97/3 PMMA/Fluorodecyl POSS | 74.7 ± 1.2 | 52.9 ± 3.8 | 33.0 ± 5.2 | 26.3 ± 2.8 | 30.1 ± 5.0 | 22.5 ± 2.8 |
| 95/5 PMMA/Fluorodecyl POSS | 91.2 ± 2.0 | 67.4 ± 3.5 | 36.6 ± 3.4 | 35.0 ± 3.5 | 34.4 ± 3.6 | 31.6 ± 5.9 |
| 90/10 PMMA/Fluorodecyl POSS | 115.2 ± 0.8 | 92.1 ± 1.8 | 54.4 ± 1.8 | 68.8 ± 8.6 | 49.8 ± 6.0 | 46.2 ± 5.8 |
| 80/20 PMMA/Fluorodecyl POSS | 118.1 ± 0.8 | 99.2 ± 0.8 | 84.6 ± 0.8 | 88.2 ± 2.7 | 79.0 ± 1.8 | 74.6 ± 2.0 |
| 70/30 PMMA/Fluorodecyl POSS | 119.8 ± 0.8 | 98.4 ± 1.8 | 89.0 ± 1.1 | 87.4 ± 3.0 | 75.8 ± 3.5 | 73.4 ± 2.9 |
| 50/50 PMMA/Fluorodecyl POSS | 118.3 ± 1.9 | 97.8 ± 3.1 | 90.7 ± 1.0 | 90.8 ± 4.0 | 78.4 ± 1.4 | 73.1 ± 0.9 |
| PEMA | 70.5 ± 1.9 | 52.4 ± 2.7 | 38.8 ± 1.5 | 19.5 ± 4.1 | 17.5 ± 1.2 | <10 |
| 99/1 PEMA/Fluorodecyl POSS | 75.9 ± 1.0 | 53.4 ± 2.5 | 39.4 ± 2.5 | 23.2 ± 2.5 | 28.0 ± 2.8 | 19.9 ± 2.2 |
| 97/3 PEMA/Fluorodecyl POSS | 98.0 ± 2.0 | 65.1 ± 3.4 | 47.8 ± 4.0 | 34.4 ± 3.7 | 46.4 ± 7.0 | 21.4 ± 2.1 |
| 95/5 PEMA/Fluorodecyl POSS | 112.7 ± 2.4 | 75.1 ± 8.8 | 65.8 ± 4.6 | 44.3 ± 7.6 | 55.2 ± 12.3 | 51.5 ± 6.2 |
| 90/10 PEMA/Fluorodecyl POSS | 119.3 ± 1.7 | 90.3 ± 3.3 | 84.9 ± 1.8 | 77.8 ± 4.1 | 70.2 ± 4.7 | 73.9 ± 1.6 |
| 80/20 PEMA/Fluorodecyl POSS | 117.9 ± 2.1 | 98.3 ± 2.3 | 88.3 ± 1.0 | 91.8 ± 2.5 | 77.7 ± 1.3 | 73.3 ± 1.6 |
| 70/30 PEMA/Fluorodecyl POSS | 117.7 ± 1.3 | 98.0 ± 2.5 | 87.1 ± 2.1 | 83.3 ± 1.8 | 78.8 ± 0.6 | 71.3 ± 3.7 |
| 50/50 PEMA/Fluorodecyl POSS | 117.8 ± 0.5 | 96.1 ± 2.0 | 91.8 ± 1.0 | 86.4 ± 1.4 | 75.7 ± 1.9 | 70.7 ± 2.1 |
| PBMA | 77.7 ± 0.8 | 59.7 ± 1.0 | 58.2 ± 1.5 | 25.7 ± 6.4 | 18.0 ± 1.8 | 13.4 ± 2.3 |
| 99/1 PBMA/Fluorodecyl POSS | 79.9 ± 2.0 | 66.8 ± 2.3 | 53.1 ± 2.4 | 23.5 ± 4.9 | 25.7 ± 5.1 | 23.2 ± 2.7 |
| 97/3 PBMA/Fluorodecyl POSS | 99.5 ± 1.6 | 82.0 ± 2.7 | 69.5 ± 1.0 | 34.1 ± 4.8 | 26.5 ± 6.7 | 36.1 ± 2.7 |
| 95/5 PBMA/Fluorodecyl POSS | 116.4 ± 1.4 | 90.7 ± 5.0 | 77.8 ± 3.2 | 35.1 ± 11.2 | 43.8 ± 5.8 | 40.9 ± 5.7 |

[a]Reported uncertainties are standard deviations from eight measured contact angle values.
[b]1H,1H,2H,2H-perfluorodecyltrichlorosilane.

Water contact angle measurements for all of the tested polymer/fluorodecyl POSS materials are presented graphically in FIG. 5A. The advancing water contact angle increased rapidly as fluorodecyl POSS is added to each of the pure polymers, reaching $\theta_{adv}$=124±4° at fluorodecyl POSS loadings of 10 wt % and above ($f_{POSS}$≥0.10). The receding water contact angles also increased as fluorodecyl POSS is added to the polymers, but they plateaued at different values for different polymeric binders. For PMMA, PEMA, and PBMA, $\theta_{rec}$ reaches 118±2° for $f_{POSS}$≥0.20, while for the Tecnoflon-containing blends $\theta_{rec}$ increased more slowly as fluorodecyl POSS was added and only reaches 114±1° when $f_{POSS}$=0.50. Comparable maximum values in $\theta_{adv}$ and different plateaus in $\theta_{rec}$ were similarly obtained for the other polar probe fluids ethylene glycol and dimethyl sulfoxide on the test surfaces, as illustrated in FIGS. 5B-5C. The data for the PEMA and PBMA materials essentially tracked those for the PMMA blends and were omitted from these plots to maximize clarity.

An alternative means of presenting these wettability data is to consider the sliding and pull-off mechanisms described by Equations 3 and 5, respectively. The two dimensionless solid-liquid interaction parameters that scale with the ease of drop removal by these processes are $S_\alpha$ for drop sliding (Equation 3) and the quantity (1+cos $\theta_{rec}$) for drop pull-off (Equation 5). A plot of $S_\alpha$ versus (1+cos $\theta_{rec}$) thus represents graphically the changes in the relative importance of these two physical processes. Data on this wettability plot must lie below and to the right of a curve that represents the limiting value $\theta_{adv}$=180° because it is not possible for $\theta_{rec}$ to exceed $\theta_{adv}$. The resistance to drop sliding increases monotonically as $S_\alpha$ increases, with data points on the abscissa ($\theta_{adv}$=$\theta_{rec}$, $S_\alpha$=0) indicative of drops that will slide or roll at any angle of tilt regardless of the magnitudes of $\theta_{adv}$ and $\theta_{rec}$. The ease of drop sliding is not a complete description of liquid wettability, however, because it does not relate directly to the practical work of adhesion required to pull a liquid drop vertically off of a substrate. This pull-off work scales with the parameter (1+cos $\theta_{rec}$) and increases monotonically with the distance along the abscissa. The most liquid-repellent substrates are characterized by both facile drop sliding (low ordinate value) and drop pull-off (low abscissa value), and are represented on this wettability diagram by the points nearest the origin.

The data for the bifunctional polar liquids water and dimethyl sulfoxide on Tecnoflon/fluorodecyl POSS blends and representative PMMA/fluorodecyl POSS materials are presented in this form in FIG. 5D. Ethylene glycol data for these surfaces substantially overlapped with the corresponding dimethyl sulfoxide curves and were omitted from this diagram to maximize clarity. The curves for the polar liquid droplets on the PMMA blends got closer to the origin than those for the Tecnoflon materials, illustrating the enhanced repellency to such liquids for the polymethacrylate blends. The optimal polymethacrylate/fluorodecyl POSS samples were in fact more liquid repellent than a spin-cast pure fluorodecyl POSS film (FIG. 6D), likely due to the smoother surface topography, and consequent higher receding contact angles, of the polymer/fluorodecyl POSS blends, as discussed earlier.

In FIG. 6A, the solid symbols denoted $\theta_{adv}$ and the hollow symbols represent $\theta_{rec}$. Stable values of $\theta_{adv}$ were difficult to ascertain for the PBMA-based materials with $0.03 \leq f_{POSS} \leq 0.30$. In FIG. 6B, the solid and hollow symbols represent $\theta_{adv}$ and $\theta_{rec}$, respectively. In FIG. 6C, the solid and hollow symbols connote $\theta_{adv}$ and $\theta_{rec}$, respectively. In FIG. 6D, the points nearest the origin corresponded to the most liquid repellent substrates. The dashed line represented $\theta_{adv} = 180°$ and the area above and to the left of this curve was not accessible because it is impossible for $\theta_{rec}$ to exceed $\theta_{adv}$. The lines between data points connect the individual measurements, from right to left, in order of increasing fluorodecyl POSS loadings: 0-1-3-5-10-20-30-50 wt %. The circles represented measurements for the pure fluorodecyl POSS film. In this plot, the minimum observed advancing angle of 95° was assigned as $\theta_{adv}$ for diiodomethane drops on the PBMA blends with $0.03 \leq f_{POSS} \leq 0.30$. If any of the larger angles observed during diiodomethane drop advancing were used as $\theta_{adv}$, $S_\alpha$ would be even higher, meaning our choice represented the maximum possible diiodomethane repellency for the PBMA materials.

A complete assessment of the liquid wettability of a substrate required information about the behavior of both polar and nonpolar liquids that contact the surface. To probe the behavior of nonpolar liquids, advancing and receding contact angles of diiodomethane, rapeseed oil, and hexadecane were also measured on all of the test substrates. The advancing and receding contact angle values for diiodomethane on each of the polymer/fluorodecyl POSS test materials were plotted as a function of the fluorodecyl POSS loading in FIG. 6A. (Stable advancing angles for diiodomethane on the PBMA blends with $0.03 \leq f_{POSS} \leq 0.30$ were difficult to measure, as illustrated in FIG. 7, and consequently were not included in FIG. 6A.) Similar to the advancing contact angle data presented in FIG. 5, the diiodomethane advancing contact angles increased rapidly as fluorodecyl POSS is added to the pure polymers and reach an asymptotic limit of $\theta_{adv} = 104 \pm 3°$ for $f_{POSS} \geq 0.10$. The receding contact angles also increase with the addition of fluorodecyl POSS and level off at $\theta_{rec} = 88 \pm 4°$ when $f_{POSS} \geq 0.20$ for the PMMA, PEMA, and Tecnoflon blends. Receding contact angle measurements for diiodomethane drops on the PBMA materials, however, remained below this plateau, much like the polar liquid receding contact angle values did on the Tecnoflon blends in FIG. 5. In contrast to the diiodomethane behavior, the trends in receding contact angle for two other nonpolar liquids, rapeseed oil and hexadecane, were not substantially different for the PBMA-based materials and the other polymer/fluorodecyl POSS blends, as illustrated in FIGS. 6B and 6C. The contact angle data for the Tecnoflon/fluorodecyl POSS and PEMA/fluorodecyl POSS materials followed the same trends as the PMMA/fluorodecyl POSS measurements and were omitted from these plots to maximize clarity.

Using the wettability diagram representation discussed above, the nonpolar liquid contact angle data for diiodomethane and hexadecane on the representative PMMA materials and outlying PBMA blends were replotted in FIG. 6D. The rapeseed oil data overlapped significantly with the hexadecane measurements and were excluded from this diagram to maximize clarity. The termination of the hexadecane (and omitted rapeseed oil) curves at essentially the same spot for both sets of materials illustrated that the maximum liquid repellency of these two liquids was similar on the PBMA-based and PMMA-based samples. In contrast, the curve for droplets of diiodomethane with $\gamma_{lv} = 50.8$ mN/m terminated closer to the origin for the PMMA materials than it does for the PBMA blends, illustrating that the diiodomethane repellency was higher for the optimal PMMA samples than for the best PBMA blend. As in FIG. 5, the optimal polymer/fluorodecyl POSS blends were even more liquid repellent than pure fluorodecyl POSS (FIG. 6D), most likely due to the increased roughness of the pure fluorodecyl POSS film.

The detailed shapes of the curves in FIGS. 5D and 6D merit some discussion. The solid lines in the diagrams guide the eye by connecting the data points in the order of increasing fluorodecyl POSS content in the films. The wettability parameter $(1 + \cos \theta_{rec})$ decreased monotonically as the fluorodecyl POSS loading increased, with one exception: the pure fluorodecyl POSS films exhibited higher $(1 + \cos \theta_{rec})$ values than the PMMA blends with fluorodecyl POSS loadings of 20 wt % and above. This slight decrease in $\theta_{rec}$ for the pure fluorodecyl POSS coatings may have been caused by subtle surface roughness effects in the pure films. In contrast to the quantity $(1 + \cos \theta_{rec})$, the sliding parameter $S_\alpha$ was not monotonic; it initially increased at low fluorodecyl POSS loadings, peaked, and then decreased towards an asymptotic minimum value. The initial rise in $S_\alpha$ was driven by an increase in contact angle hysteresis that resulted from $\theta_{adv}$ increasing more rapidly than $\theta_{rec}$ as fluorodecyl POSS was added to the neat polymers. The subsequent decrease in $S_\alpha$ occurred as $\theta_{adv}$ reached a plateau while $\theta_{rec}$ continued to increase towards its asymptotic maximum value, which minimized the hysteresis. The unequal rates of change in $\theta_{adv}$ and $\theta_{rec}$ were likely driven by different sensitivities of contact line pinning to the multiple components of a chemically heterogeneous surface. The advancing contact line was most sensitive to the low energy portion of the surface and increased rapidly as fluorodecyl POSS began to occupy a significant fraction of the surface. The receding contact line, in contrast, was most sensitive to the high energy components of the surface (i.e., the polymer rich domains), and did not increase substantially until the fluorodecyl POSS domains covered nearly all of the surface.

In general, pinning of the receding contact line and contact angle hysteresis are sensitive to three surface properties: roughness, chemical heterogeneity, and molecular rearrangements in the solid subphase. See, for example, C. W. Extrand, In *Encyclopedia of Colloid and Surface Science, Vol. 4*; P. Somasundaran, Ed.; Boca Raton, Fla., CRC Press, 2006, 2876-2891, which is incorporated by reference in its entirety. Systematic differences in one or more of these surface attributes were likely responsible for the sensitivity of receding contact angle measurements for diiodomethane and polar liquid drops to the identity of the polymeric binder for the materials with $f_{POSS} \geq 0.20$. The contact angle data did not vary systematically with variations in roughness for the different polymeric binders, as only the polar liquids and diiodomethane exhibited a dependence of $\theta_{rec}$ on the identity of the polymer. The variations in liquid wettability for the different blend series must therefore be driven by specific interactions between certain contacting liquids and the blend surfaces. XPS was deployed to examine possible differences in chemical heterogeneity by probing the chemical composition of the top 10 nm of films of 80/20 Tecnoflon/fluorodecyl POSS and 80/20 PEMA/fluorodecyl POSS. See, for example, Y. Mao and K. K. Gleason, *Macromolecules*, 2006, 39, 3895-3900 and D. L. Schmidt, et al. *Nature*, 1994, 368, 39-41, each of which has been incorporated by reference in its entirety. These XPS survey and high resolution carbon 1s spectra are provided in FIG. 8. The atomic ratios calculated from these raw data are provided in Table 4 along with those expected for pure fluorodecyl POSS. The values for the two test surfaces were essentially identical, and very close to those expected for pure fluorodecyl POSS. These results were consistent with the fluorodecyl POSS molecules blooming up and minimizing chemical heterogeneity by covering nearly the entire surface of each blend.

TABLE 4

Measured atomic ratios at the surfaces of 80/20 Tecnoflon/fluorodecyl POSS and 80/20 PEMA/fluorodecyl POSS materials and calculated atomic ratios for pure fluorodecyl POSS

| Sample | F/C | O/C | Si/C |
|---|---|---|---|
| 80/20 Tecnoflon/Fluorodecyl POSS | 1.52[a] | 0.11[a] | 0.08[a] |
| 80/20 PEMA/Fluorodecyl POSS | 1.54[a] | 0.11[a] | 0.09[a] |
| Fluorodecyl POSS | 1.7[b] | 0.15[b] | 0.1[b] |

[a]Determined using XPS survey spectra.
[b]Calculated values.

The surface composition of each polymer/fluorodecyl POSS blend can also be altered by molecular rearrangement that is induced by contact with the probe fluid. See, for example, C. W. Extrand, In *Encyclopedia of Colloid and Surface Science, Vol. 4*; P. Somasundaran, Ed.; Boca Raton, Fla., CRC Press, 2006, 2876-2891, which is incorporated by reference in its entirety. Such reorientations lower the total free energy of the three phase system by increasing favorable interactions between the liquid and the underlying substrate and consequently reducing $\theta_{rec}$. See, for example, Y. Mao and K. K. Gleason, *Macromolecules*, 2006, 39, 3895-3900, which is incorporated by reference in its entirety. Such surface rearrangements may be responsible for the systematically lower receding contact angle values measured for polar liquids on Tecnoflon/fluorodecyl POSS blends and for diiodomethane drops on PBMA/fluorodecyl POSS materials. Both Tecnoflon and PMBA contain segments that are rubbery and mobile at room temperature, as evidenced by the measured glass transition temperatures of −9° C. for Tecnoflon and 10° C. for PBMA. The acidic —$CF_2$—$CH_2$— protons in Tecnoflon and the dispersive alkyl segments in PBMA can reorient to enhance favorable interactions with the appropriate contacting liquids. See, for example, S. Lee, J. S. Park, and T. R. Lee, *Langmuir*, 2008, 24, 4817-4826, which is incorporated by reference in its entirety. The glassy PMMA ($T_g$=124° C.) and PEMA ($T_g$=77° C.) segments do not, in contrast, possess sufficient mobility at room temperature to quickly reorient.

The advancing and receding contact angle measurements for all six test liquids can be used in conjunction with the matrix formulation provided in Equation 8 and the protocol described in the Examples to calculate the dispersion ($\gamma_{sv,i}^d$), acidic ($\gamma_{sv,i}^+$), and basic ($\gamma_{sv,i}^-$) components of the advancing and receding solid surface energy values $\gamma_{sv,a}$ and $\gamma_{sv,r}$. Advancing contact angle data for diiodomethane on the PBMA blends with $0.03 \le f_{POSS} \le 0.30$ are not used in these calculations because the drops advanced by a slip/stick mechanism, making the measurements unreliable for surface energy analysis. See, for example, D. Y. Kwok and A. W. Neumann, *Adv. Colloid Interface Sci.*, 1999, 81, 167-249, which is incorporated by reference in its entirety. The surface energy values for all of our test materials are provided in Table 5. Notably the fluorodecyl POSS materials were distinguishable from fluorinated alternatives such as Teflon AF-2400 and 1H,1H,2H,2H-perfluorodecyltrichlorosilane (fluoroalkylsilane), which is widely used by the surface science community to reduce the liquid wettability of substrates. The key differences amongst these fluorinated materials did not appear in the often-considered advancing surface energy values $\gamma_{sv,a}$, which were comparable. Rather it was the receding surface energy values $\gamma_{sv,r}$ that were noticeably higher for Teflon AF-2400 and the fluoroalkylsilane than they were for the optimized fluorodecyl POSS-containing samples. It was the low receding surface energy values that minimize the resistance to both drop sliding and drop pull-off and distinguished fluorodecyl POSS as a strongly liquid repellent material.

Figure 9:
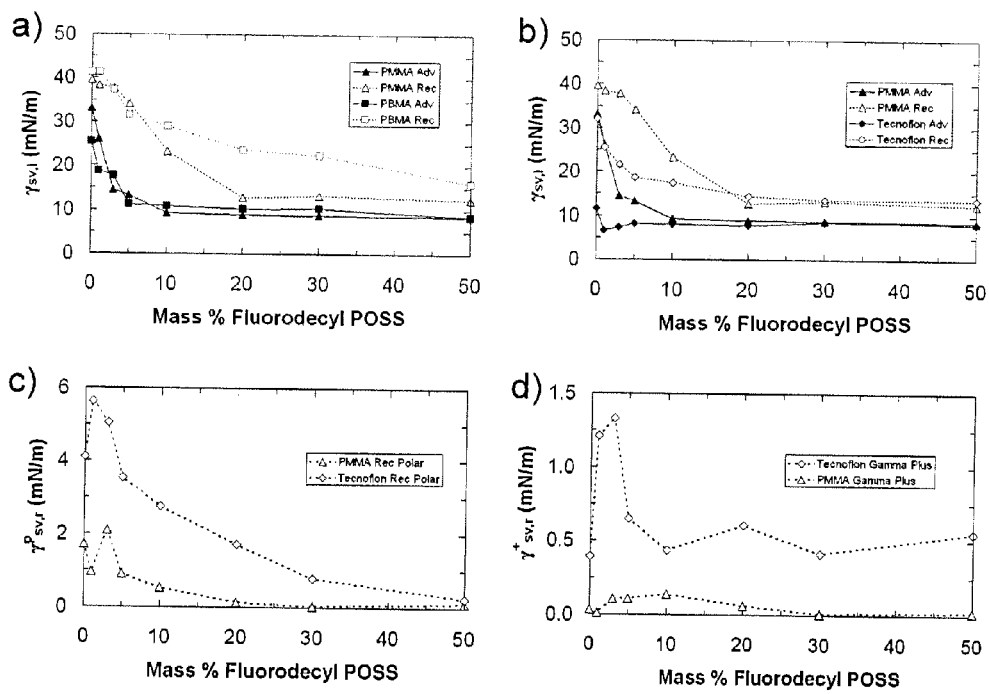

Surface energy terms for selected representative test samples were plotted in FIG. 9 to examine the trends when fluorodecyl POSS is blended with the various polymers. Solid symbols denote advancing values while hollow symbols indicate receding terms. FIG. 9A shows the variation in the overall advancing and receding surface energy values $\gamma_{sv,a}$ and $\gamma_{sv,r}$ for the PMMA/fluorodecyl POSS and PBMA/fluorodecyl POSS blends as a function of the fluorodecyl POSS loading. The advancing surface energy values for both sets of materials decreased sharply as fluorodecyl POSS was blended with the pure polymers and reach a minimum value of $\gamma_{sv} \approx 9 \pm 1$ mN/m for fluorodecyl POSS loadings of 10 wt % and above. The receding surface energy values of these two series of blends differed significantly, however, due to the marked differences in receding contact angles of diiodomethane drops. For the PMMA materials, $\gamma_{sv,r}$ declined as fluorodecyl POSS was added and reached a minimum of $\gamma_{sv,r}$=13±1 mN/m for $f_{POSS} \ge 0.20$. The values of the receding surface energy values for the PBMA materials also decreased as fluorodecyl POSS was added, but did so to much less of an extent than they did for the PMMA blends and only reached a minimum value of 16 mN/m for $f_{POSS}$=0.50. These elevated values of $\gamma_{sv,r}$ for PBMA surfaces were the result of larger dispersion interactions $\gamma_{sv,r}^d$. This increase in $\gamma_{sv,r}^d$ may have been driven by molecular rearrangements in the more leathery PBMA materials that enable favorable interactions between diiodomethane and the polymer chains. Similar molecular reorientations were not prevalent in the glassy PMMA ($T_g$=124° C.) and PEMA ($T_g$=77° C.) materials because the polymer chains did not possess sufficient mobility for rapid rearrangement.

TABLE 5

Values of total ($\gamma_{sv,i}$), dispersion ($\gamma_{sv,i}^d$), polar ($\gamma_{sv,i}^p$), hydrogen bond donating ($\gamma_{sv,i}^+$), and hydrogen bond accepting ($\gamma_{sv,i}^-$) surface energy values calculated from advancing and receding contact angles[a]

| | Surface Energy Values from Advancing Contact Angles (mN/m) | | | | | Surface Energy Values from Receding Contact Angles (mN/m) | | | | |
|---|---|---|---|---|---|---|---|---|---|---|
| Sample | $\gamma_{sv,a}$ | $\gamma_{sv,a}^d$ | $\gamma_{sv,a}^p$ | $\gamma_{sv,a}^+$ | $\gamma_{sv,a}^-$ | $\gamma_{sv,r}$ | $\gamma_{sv,r}^d$ | $\gamma_{sv,r}^p$ | $\gamma_{sv,r}^+$ | $\gamma_{sv,r}^-$ |
| Teflon AF-2400 | 9.6 | 9.6 | 0.01 | 0.01 | 0.03 | 16.6 | 16.1 | 0.42 | 0.05 | 0.82 |
| Fluoroalkylsilane[b] | 8.6 | 8.5 | 0.10 | 0.01 | 0.53 | 22.7 | 21.2 | 1.5 | 0.11 | 5.1 |

TABLE 5-continued

Values of total ($\gamma_{sv,i}$), dispersion ($\gamma_{sv,i}^d$), polar ($\gamma_{sv,i}^p$), hydrogen bond donating ($\gamma_{sv,i}^+$), and hydrogen bond accepting ($\gamma_{sv,i}^-$) surface energy values calculated from advancing and receding contact angles[a]

| Sample | Surface Energy Values from Advancing Contact Angles (mN/m) | | | | | Surface Energy Values from Receding Contact Angles (mN/m) | | | | |
|---|---|---|---|---|---|---|---|---|---|---|
| | $\gamma_{sv,a}$ | $\gamma_{sv,a}^d$ | $\gamma_{sv,a}^p$ | $\gamma_{sv,a}^+$ | $\gamma_{sv,a}^-$ | $\gamma_{sv,r}$ | $\gamma_{sv,r}^d$ | $\gamma_{sv,r}^p$ | $\gamma_{sv,r}^+$ | $\gamma_{sv,r}^-$ |
| PC | 39.3 | 35.2 | 4.1 | 0.23 | 18.4 | 40.4 | 38.3 | 2.1 | 0.10 | 11.4 |
| PMMA | 33.1 | 32.3 | 0.88 | 0.01 | 13.3 | 39.6 | 37.9 | 1.7 | 0.03 | 23.1 |
| 99/1 PMMA/Fluorodecyl POSS | 26.1 | 25.3 | 0.81 | 0.51 | 0.33 | 38.4 | 37.4 | 0.97 | 0.01 | 21.2 |
| 97/3 PMMA/Fluorodecyl POSS | 14.5 | 13.4 | 1.1 | 0.95 | 0.30 | 37.7 | 35.6 | 2.1 | 0.10 | 10.7 |
| 95/5 PMMA/Fluorodecyl POSS | 13.2 | 13.0 | 0.21 | 0.05 | 0.22 | 34.1 | 33.2 | 0.91 | 0.11 | 1.9 |
| 90/10 PMMA/Fluorodecyl POSS | 9.2 | 9.2 | 0.04 | 0.01 | 0.25 | 23.3 | 22.7 | 0.53 | 0.14 | 0.50 |
| 80/20 PMMA/Fluorodecyl POSS | 8.9 | 8.9 | 0.04 | 0.00 | 0.19 | 12.7 | 12.6 | 0.14 | 0.06 | 0.08 |
| 70/30 PMMA/Fluorodecyl POSS | 8.7 | 8.7 | 0.01 | 0.00 | 0.26 | 13.3 | 13.2 | 0.03 | 0.01 | 0.04 |
| 50/50 PMMA/Fluorodecyl POSS | 8.5 | 8.5 | 0.00 | 0.00 | 0.26 | 12.4 | 12.3 | 0.12 | 0.02 | 0.20 |
| PEMA | 29.7 | 28.6 | 1.1 | 0.04 | 7.0 | 38.6 | 38.1 | 0.53 | 0.01 | 15.9 |
| 99/1 PEMA/Fluorodecyl POSS | 22.9 | 21.8 | 1.1 | 0.18 | 1.7 | 37.3 | 36.4 | 0.94 | 0.02 | 10.6 |
| 97/3 PEMA/Fluorodecyl POSS | 12.9 | 12.8 | 0.14 | 0.02 | 0.27 | 32.9 | 32.5 | 0.44 | 0.15 | 0.33 |
| 95/5 PEMA/Fluorodecyl POSS | 10.0 | 9.9 | 0.07 | 0.01 | 0.33 | 27.5 | 27.2 | 0.28 | 0.06 | 0.33 |
| 90/10 PEMA/Fluorodecyl POSS | 9.1 | 9.0 | 0.12 | 0.01 | 0.38 | 15.9 | 15.8 | 0.09 | 0.06 | 0.04 |
| 80/20 PEMA/Fluorodecyl POSS | 8.9 | 8.9 | 0.02 | 0.00 | 0.16 | 12.3 | 12.1 | 0.21 | 0.03 | 0.32 |
| 70/30 PEMA/Fluorodecyl POSS | 8.9 | 8.9 | 0.04 | 0.01 | 0.11 | 13.9 | 13.9 | 0.03 | 0.00 | 0.15 |
| 50/50 PEMA/Fluorodecyl POSS | 8.6 | 8.6 | 0.03 | 0.01 | 0.10 | 13.7 | 13.6 | 0.02 | 0.00 | 0.24 |
| PBMA | 25.4 | 25.3 | 0.12 | 0.00 | 4.7 | 41.2 | 37.0 | 4.3 | 0.33 | 14.0 |
| 99/1 PBMA/Fluorodecyl POSS[c] | 18.8 | 17.3 | 1.5 | 0.59 | 1.0 | 41.2 | 37.0 | 4.3 | 0.39 | 12.2 |
| 97/3 PBMA/Fluorodecyl POSS[c] | 17.7 | 17.0 | 0.70 | 0.27 | 0.46 | 37.2 | 33.8 | 3.4 | 1.0 | 2.8 |
| 95/5 PBMA/Fluorodecyl POSS[c] | 11.2 | 11.1 | 0.16 | 0.04 | 0.17 | 31.5 | 31.4 | 0.12 | 1.1 | 0.01 |
| 90/10 PBMA/Fluorodecyl POSS[c] | 10.9 | 10.5 | 0.39 | 0.07 | 0.52 | 29.0 | 28.7 | 0.32 | 0.99 | 0.03 |
| 80/20 PBMA/Fluorodecyl POSS[c] | 10.2 | 9.8 | 0.38 | 0.06 | 0.59 | 23.6 | 23.5 | 0.10 | 0.40 | 0.01 |
| 70/30 PBMA/Fluorodecyl POSS[c] | 10.3 | 10.2 | 0.13 | 0.03 | 0.13 | 22.4 | 21.6 | 0.83 | 0.68 | 0.25 |
| 50/50 PBMA/Fluorodecyl POSS | 8.5 | 8.5 | 0.01 | 0.00 | 0.01 | 16.1 | 16.0 | 0.10 | 0.02 | 0.15 |
| Tecnoflon | 11.6 | 11.4 | 0.22 | 0.05 | 0.23 | 32.1 | 28.0 | 4.1 | 0.39 | 10.8 |
| 99/1 Tecnoflon/Fluorodecyl POSS | 6.5 | 6.1 | 0.42 | 0.06 | 0.78 | 25.4 | 19.8 | 5.6 | 1.2 | 6.6 |
| 97/3 Tecnoflon/Fluorodecyl POSS | 7.3 | 7.0 | 0.27 | 0.03 | 0.57 | 21.7 | 16.6 | 5.1 | 1.3 | 4.8 |
| 95/5 Tecnoflon/Fluorodecyl POSS | 8.1 | 8.0 | 0.06 | 0.01 | 0.30 | 18.6 | 15.1 | 3.5 | 0.65 | 4.9 |
| 90/10 Tecnoflon/Fluorodecyl POSS | 8.0 | 7.9 | 0.14 | 0.01 | 0.45 | 17.4 | 14.7 | 2.7 | 0.44 | 4.3 |
| 80/20 Tecnoflon/Fluorodecyl POSS | 7.8 | 7.8 | 0.01 | 0.00 | 0.36 | 14.5 | 12.8 | 1.7 | 0.60 | 1.2 |
| 70/30 Tecnoflon/Fluorodecyl POSS | 8.5 | 8.4 | 0.11 | 0.02 | 0.19 | 13.6 | 12.8 | 0.79 | 0.41 | 0.38 |
| 50/50 Tecnoflon/Fluorodecyl POSS | 8.2 | 8.1 | 0.04 | 0.01 | 0.06 | 13.6 | 13.4 | 0.25 | 0.55 | 0.03 |
| Fluorodecyl POSS | 8.0 | 7.9 | 0.02 | 0.00 | 0.18 | 14.5 | 13.9 | 0.60 | 0.23 | 0.38 |

[a]Consideration of a typical error in contact angle measurement ($\Delta\theta \approx 2°$) and the condition number of the transformation matrix in the system of linear equations yields an approximately 15% relative error in the calculated surface energy values.
[b]1H,1H,2H,2H-Perfluorodecyltrichlorosilane.
[c]Advancing contact angles of diiodomethane drops on PBMA blends with $0.01 \leq f_{POSS} \leq 0.30$ were difficult to measure (see FIG. 7) and were not used to calculate the advancing surface energy terms for these materials.

The advancing and receding surface energy values of PMMA/fluorodecyl POSS and Tecnoflon/fluorodecyl POSS materials were plotted as a function of the fluorodecyl POSS loading in FIG. 9B. For both sets of materials, $\gamma_{sv,a}$ and $\gamma_{sv,r}$ decreased as the fluorodecyl POSS loadings were increased and reach plateaus of $\gamma_{sv,a} = 8 \pm 2$ mN for $f_{POSS} \geq 0.10$ and $\gamma_{sv,r} = 13 \pm 2$ mN for $f_{POSS} \geq 0.20$. Despite the similar values of $\gamma_{sv,r}$ for samples with $f_{POSS} \geq 0.20$, the receding contact angles of polar liquids were consistently lower on the Tecnoflon materials than on the PMMA blends, as was shown in FIG. 5. Understanding the energetic characteristics that drive this difference in polar liquid wettability required a closer examination of the subcomponents of $\gamma_{sv,r}$.

The polar contributions to the receding surface energy $\gamma_{sv,r}^P$ were plotted as a function of fluorodecyl POSS content for the PMMA-based and Tecnoflon-based materials in FIG. 9C. In contrast to the calculated values shown in FIG. 9B, here there was a clear difference between these two data sets, with the polar contribution $\gamma_{sv,r}^P$ always lower for the PMMA surfaces than for the Tecnoflon substrates. Such a result was consistent with the lower receding contact angles that were measured for droplets of polar liquids on the Tecnoflon-containing materials as compared to the PMMA samples (see FIG. 5 or Table 3). However, the monotonic decrease in $\gamma_{sv,r}^P$ for the Tecnoflon/fluorodecyl POSS samples with increasing fluorodecyl POSS content did not correlate with the measured values of receding contact angles for ethylene glycol and dimethyl sulfoxide drops. Neither of these liquids exhibited values of $\theta_{rec}$ that increase as $\gamma_{sv,r}^P$ decreases. Rather, both fluids establish statistically-indistinguishable values of the receding contact angle $\theta_{rec}$ on all of the Tecnoflon-based samples with at least 20 wt % fluorodecyl POSS.

The polar contribution to the receding surface energy $\gamma_{sv,r}^P$ did not correlate with the measured values of the receding contact angles for ethylene glycol and dimethyl sulfoxide because $\gamma_{sv,r}^P$ is a function of the product of the acidic and basic contributions to the solid surface energy $\gamma_{sv,r}^+$ and $\gamma_{sv,r}^-$, respectively, as defined in Equation 6. Liquid contact angles were not, however, sensitive to this product of solid surface parameters, but rather depended on the complementary acid/base interactions between the solid and the contacting fluid, as demonstrated in Equation 7. Thus it is the cross products $\sqrt{\gamma_{sv,r}^+ \gamma_{lv}^-}$ and $\sqrt{\gamma_{sv,r}^- \gamma_{lv}^+}$ and not $\gamma_{sv,r}^P$, that influence receding liquid contact angles. For our analysis, we selected the widely used, albeit arbitrary, reference state in which water is characterized by equivalent acidic and basic components such that $\gamma_{lv}^+ = \gamma_{lv}^- = 25.5$ mN/m. Most polar liquids other than water, including the ethylene glycol and dimethyl sulfoxide used in this work, are characterized as basic (i.e., high values of $\gamma_{lv}^-$) when this reference state is used. The wettability of these more basic liquids is sensitive to the complementary acidic component of the solid surface energy $\gamma_{sv,r}^+$, and the magnitude of such contributions can be examined by computing the components of the practical work of adhesion (Equation 7). These values were provided in Table 6 for the representative interactions between ethylene glycol and four different test surfaces, along with the measured values of the receding contact angle $\theta_{rec}$ for ethylene glycol. The substantial difference in the interactions between ethylene glycol (and other basic liquids) and these two sets of surfaces was that the $\sqrt{\gamma_{sv,r}^+ \gamma_{lv}^-}$ contribution was significantly higher for the Tecnoflon blends than it was for the PMMA materials. The solid surface characteristic responsible for this $\sqrt{\gamma_{sv,r}^+ \gamma_{lv}^-}$ interaction was the term $\gamma_{sv,r}^+$, and this latter parameter was plotted as a function of fluorodecyl POSS loading for the PMMA and Tecnoflon materials in FIG. 9D. The $\gamma_{sv,r}^+$ values reached a plateau for both sample sets once the fluorodecyl POSS loading reached 20 wt %, with the Tecnoflon $\gamma_{sv,r}^+$ plateau well above its PMMA counterpart.

These differences in the acidic component of the solid surface energy $\gamma_{sv,r}^+$ may reduce receding contact angles for basic liquids on Tecnoflon/fluorodecyl POSS samples with $f_{POSS} \geq 0.20$ below the values exhibited by the same fluids on PMMA blends with comparable compositions. Furthermore, the invariance in both $\gamma_{sv,r}^+$ and $\gamma_{sv,r}^d$ for $f_{POSS} \geq 0.20$ was consistent with the plateaus in polar liquid $\theta_{rec}$ that were reported in Table 3. This consistency with all aspects of the experimental liquid contact angle trends made $\gamma_{sv,r}^+$ (or $\gamma_{sv,r}^-$ for acidic liquids) a more relevant parameter than $\gamma_{sv,r}^P$ in the assessment of the liquid wettability of a surface. In general, consideration of the total polar contribution to the solid surface energy $\gamma_{sv,r}^P$ was of limited utility for several reasons. First, $\gamma_{sv,r}^P = \sqrt{\gamma_{sv,r}^+ \gamma_{sv,r}^-}$ is the product of the individual acidic and basic energetic characteristics of the solid surface itself. The solid surface is not interacting with itself, however, but rather with contacting liquids, and it is the cross products $\sqrt{\gamma_{sv,r}^+ \gamma_{lv}^-}$ and $\sqrt{\gamma_{sv,r}^- \gamma_{lv}^+}$ that influence liquid wettability. Second, the polar contribution to the surface energy $\gamma_{sv,r}^P$ can have a small magnitude that makes it appear negligible relative to $\gamma_{sv,r}^d$ when either $\gamma_{sv,r}^+$ or $\gamma_{sv,r}^-$ is near zero. This apparently low contribution of polar terms can lead to the erroneous conclusion that polar liquids do not interact specifically with a surface. For example, the 50/50 Tecnoflon/fluorodecyl POSS and 50/50 PEMA/fluorodecyl POSS samples were characterized by comparable values of the total receding surface energy $\gamma_{sv,r}$, and for both materials the polar contributions $\gamma_{sv,r}^P$ were less than 2% of $\gamma_{sv,r}$. However, these similarities in $\gamma_{sv,r}$ and $\gamma_{sv,r}^P$ did not lead to comparable repellency for basic liquids. The receding contact angles of both dimethyl sulfoxide and ethylene glycol were higher on 50/50 PEMA/fluorodecyl POSS than they were on 50/50 Tecnoflon/fluorodecyl POSS. These differences in $\theta_{rec}$ can only be rationalized when $\gamma_{sv,r}^+$ (or $\gamma_{sv,r}^-$ for acidic liquids), $\gamma_{sv,r}^d$ and, by extension, the three subcomponents of the practical work of adhesion ($\sqrt{\gamma_{sv,r}^d \gamma_{lv}^d}$, $\sqrt{\gamma_{sv,r}^+ \gamma_{lv}^-}$, and $\sqrt{\gamma_{sv,r}^- \gamma_{lv}^+}$) were evaluated.

TABLE 6

Ethylene glycol receding contact angles and values of the contributions to the practical work of adhesion $W_p$ for ethylene glycol on 80/20 PMMA/fluorodecyl POSS, 50/50 PMMA/fluorodecyl POSS, 80/20 Tecnoflon/fluorodecyl POSS, and 50/50 Tecnoflon/fluorodecyl POSS

| Sample | Ethylene Glycol $\theta_{rec}$ | Absolute Magnitudes (mN/m) | | | Fraction of $W_p$ | | |
|---|---|---|---|---|---|---|---|
| | | $\sqrt{\gamma_{sv,r}^d \gamma_{lv}^d}$ | $\sqrt{\gamma_{sv,r}^+ \gamma_{lv}^-}$ | $\sqrt{\gamma_{sv,r}^- \gamma_{lv}^+}$ | $\sqrt{\gamma_{sv,r}^d \gamma_{lv}^d}$ | $\sqrt{\gamma_{sv,r}^+ \gamma_{lv}^-}$ | $\sqrt{\gamma_{sv,r}^- \gamma_{lv}^+}$ |
| 80/20 PMMA/Fluorodecyl POSS | 99.2 ± 0.8 | 19.0 | 1.7 | 0.1 | 0.91 | 0.08 | 0.01 |

TABLE 6-continued

Ethylene glycol receding contact angles and values of the contributions to the practical work of adhesion $W_p$ for ethylene glycol on 80/20 PMMA/fluorodecyl POSS, 50/50 PMMA/fluorodecyl POSS, 80/20 Tecnoflon/fluorodecyl POSS, and 50/50 Tecnoflon/fluorodecyl POSS

| Sample | Ethylene Glycol $\theta_{rec}$ | Absolute Magnitudes (mN/m) | | | Fraction of $W_p$ | | |
|---|---|---|---|---|---|---|---|
| | | $\sqrt{\gamma_{sv,r}^d \gamma_{lv}^d}$ | $\sqrt{\gamma_{sv,r}^+ \gamma_{lv}^-}$ | $\sqrt{\gamma_{sv,r}^- \gamma_{lv}^+}$ | $\sqrt{\gamma_{sv,r}^d \gamma_{lv}^d}$ | $\sqrt{\gamma_{sv,r}^+ \gamma_{lv}^-}$ | $\sqrt{\gamma_{sv,r}^- \gamma_{lv}^+}$ |
| 50/50 PMMA/Fluorodecyl POSS | 97.8 ± 3.1 | 18.8 | 0.9 | 0.6 | 0.92 | 0.05 | 0.03 |
| 80/20 Tecnoflon/Fluorodecyl POSS | 85.5 ± 2.1 | 19.1 | 5.3 | 1.5 | 0.74 | 0.21 | 0.05 |
| 50/50 Tecnoflon/Fluorodecyl POSS | 86.5 ± 1.6 | 19.6 | 5.1 | 0.2 | 0.79 | 0.20 | 0.01 |

The most liquid-repellent fluorodecyl POSS-containing materials studied herein were the PMMA/fluorodecyl POSS and PEMA/fluorodecyl POSS blends with fluorodecyl POSS loadings of 20 wt % and above. These blends were generally even more liquid repellent than pure fluorodecyl POSS coatings because the addition of a polymeric binder facilitated the deposition of smooth films that minimize contact line pinning and liquid adhesion. There were numerous other benefits to mixing polymers with fluorodecyl POSS besides reducing coating roughness. First, as a result of surface segregation, only ~20 wt % fluorodecyl POSS was required to maximize liquid repellency. The PMMA and PEMA matrix polymers are significantly cheaper than the fluorodecyl POSS and widely available commercially, reducing the cost of liquid repellent fluorodecyl POSS-based coatings. Furthermore, the polymer/fluorodecyl POSS blends were optically transparent, as illustrated in FIG. 10A. Pure fluorodecyl POSS coatings, on the other hand, were white powder that hinders transmission of visible light, as illustrated in FIG. 10B. Finally, cross-cut tape adhesion tests revealed that the PMMA/fluorodecyl POSS and PEMA/fluorodecyl POSS blends adhered significantly more strongly to the underlying substrates than either the Tecnoflon/fluorodecyl POSS or pure fluorodecyl POSS coatings. Large sections of an 80/20 Tecnoflon/fluorodecyl POSS blend (ASTM-categorized adhesion strength of 1B) and pure fluorodecyl POSS coating (3B) were removed from coated silicon wafers during the test while an 80/20 PEMA/fluorodecyl POSS film remains adhered to the underlying substrate (5B). FIG. 11A-B shows photographs of silicon wafers coated with the 80/20 blends and subjected to the cross-cut adhesion test. The high surface energy of the PMMA and PEMA materials rendered them effective adhesion promoters for the liquid repellent coatings that contain surface-segregated fluorodecyl POSS and enhanced the durability of the liquid repellent coatings.

Low surface energy fluorodecyl POSS is a promising material for fabricating liquid repellent coatings, but is characterized by a number of drawbacks in its pure form, including high cost, a tendency to deposit from solution as a rough film, a lack of optical transparency, and poor adhesion to underlying substrates. Blends comprising 0-50 wt % fluorodecyl POSS dispersed in a Tecnoflon, PMMA, PEMA, or PBMA binder have been made. Each of the shortcomings of pure fluorodecyl POSS films can be addressed through dispersion into an appropriately selected polymeric matrix.

The liquid wettability of each blend was probed by measuring advancing and receding contact angles of three polar liquids (water, ethylene glycol, and dimethyl sulfoxide) and three nonpolar fluids (diiodomethane, rapeseed oil, and hexadecane). The resulting contact angle data were concisely represented in the form of wettability diagrams (FIGS. 5D and 6D) in which a geometrically-determined drop sliding parameter (Equation 3) was plotted against a drop pull-off factor (Equation 5) to intuitively illustrate the relative liquid wettability (or repellency) of each test substrate. Additional quantitative characterization of the test coatings was completed by using the Girifalco-Good framework to calculate the individual polar, dispersive, and acidic/basic components of advancing and receding surface energy values. While a number of the studied polymer/fluorodecyl POSS coatings were characterized by an advancing surface energy as low as 9±1 mN/m, the receding solid surface energy values and their individual contributions are sensitive to the specific composition of the polymeric binder. These variations in the energy contributions associated with a receding drop are important because it is low receding interactions that minimize pinning of a receding contact line and resistance to both drop sliding (Equation 3) and drop pull-off (Equation 5). It was important to consider the individual acidic and basic contributions $\gamma_{sv,r}^+$ and $\gamma_{sv,r}^-$ because it is the binary solid-liquid interactions $\sqrt{\gamma_{sv,r}^+ \gamma_{lv}^-}$ and $\sqrt{\gamma_{sv,r}^- \gamma_{lv}^+}$, not the solid polar contribution $\gamma_{sv,r}^p$, that influence liquid wettability. Specific acid-base interactions may take place even on surfaces characterized by very low values of the polar contribution $\gamma_{sv,r}^p$ because either: (i) $\gamma_{lv}^+$ or $\gamma_{lv}^-$ is very large; (ii) a near-zero value of $\gamma_{sv,r}^+$ (or $\gamma_{sv,r}^-$) makes $\gamma_{sv,r}^p$ appear negligible even though $\gamma_{sv,r}^-$ (or $\gamma_{sv,r}^+$) is significant. It was the low values of $\gamma_{sv,r}^d$, $\gamma_{sv,r}^+$, and $\gamma_{sv,r}^-$ that truly distinguished fluorodecyl POSS as a strongly liquid-repellent material.

The weakest solid-liquid interactions were obtained on PMMA/fluorodecyl POSS and PEMA/fluorodecyl POSS blends with fluorodecyl POSS loadings of 20 wt % and above. These PMMA/ and PEMA/fluorodecyl POSS materials were characterized by even lower apparent receding surface energy values than pure fluorodecyl POSS coatings, most likely due to the surface roughness of the pure fluorodecyl POSS films. The addition of the PMMA or PEMA matrix phase had a number of other performance benefits besides facilitating the deposition of smooth films. These desirable attributes included reducing the amount of expensive fluorodecyl POSS required to provide maximum liquid repellency, imparting optical transparency to fluorodecyl POSS-based films, and enhancing the adhesion of the liquid repellent coating to underlying substrates. These improvements in performance may facilitate the adoption of fluorodecyl POSS-based materials as coatings in liquid repellency applications.

Figure 11:
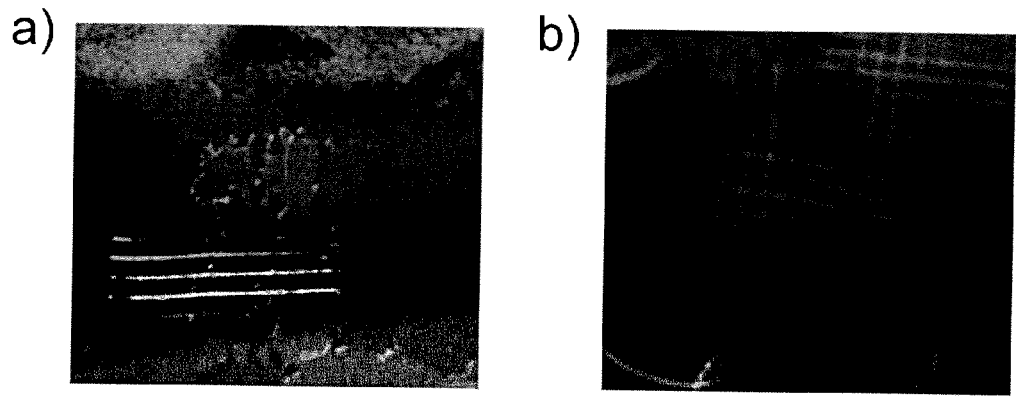

The above-mentioned nanocomposites which are optically transparent may also adhere strongly to substrates and resist smudging by fingerprints. Blends containing a relatively high surface energy polymer (e.g., poly(methyl methacrylate), poly(ethyl methacrylate) (PEMA), poly(butyl methacrylate)) adhere more strongly to surface than those containing the fluoropolymer Tecnoflon, as illustrated in FIG. 11. The 80/20 PEMA/fluorodecyl POSS blend was characterized by a low surface energy (~14 mN/m) calculated from receding liquid contact angles of water, dimethyl sulfoxide, and diiodomethane. This low "receding surface energy" (i.e., high receding liquid contact angles) correlates strongly with the fingerprint resistance of these coatings, a characteristic that has not been identified previously as critical to the development of smudge-resistant surfaces.

Figure 6:
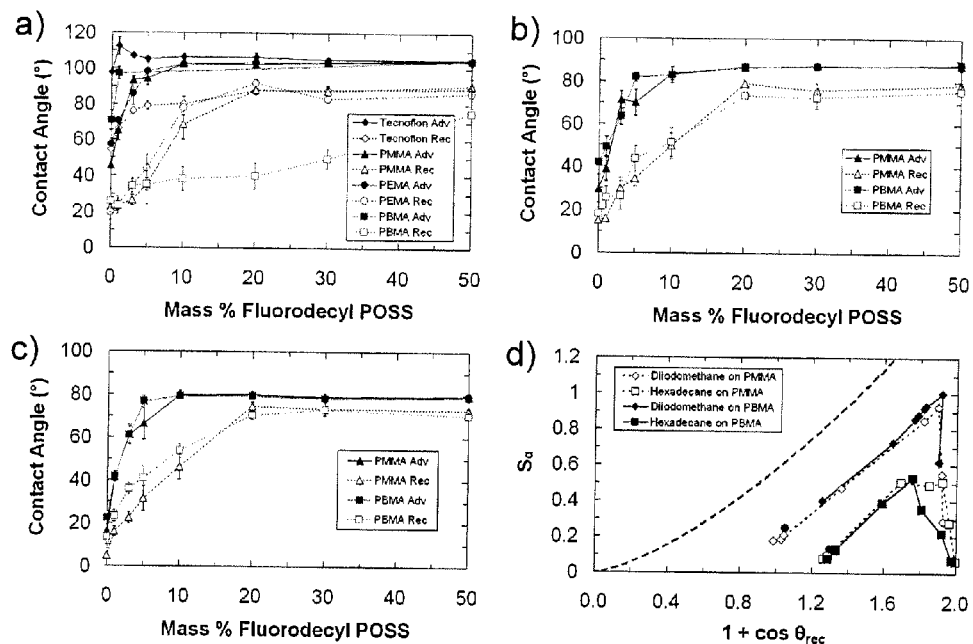
Figure 7:
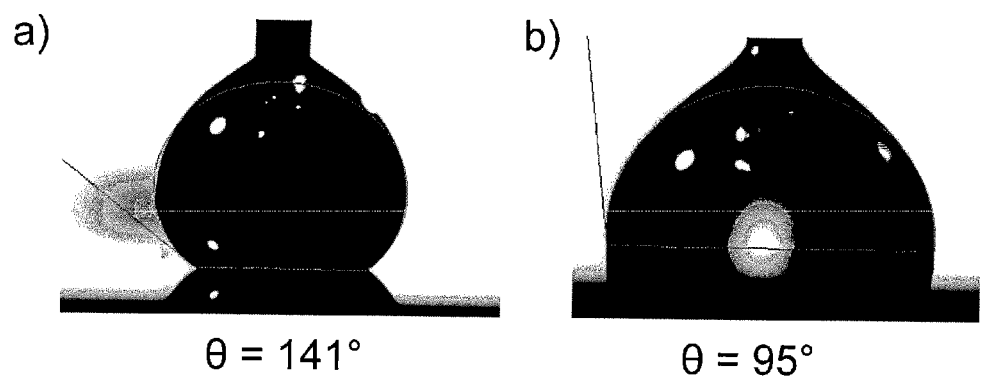
Figure 8:
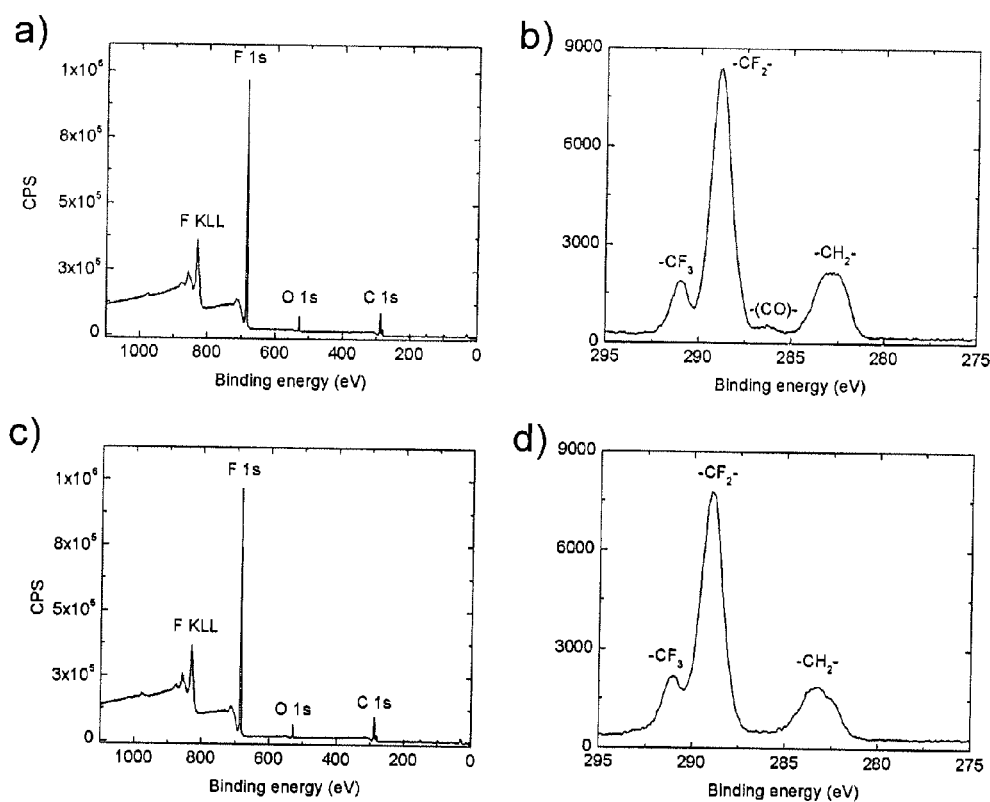
Figure 12:
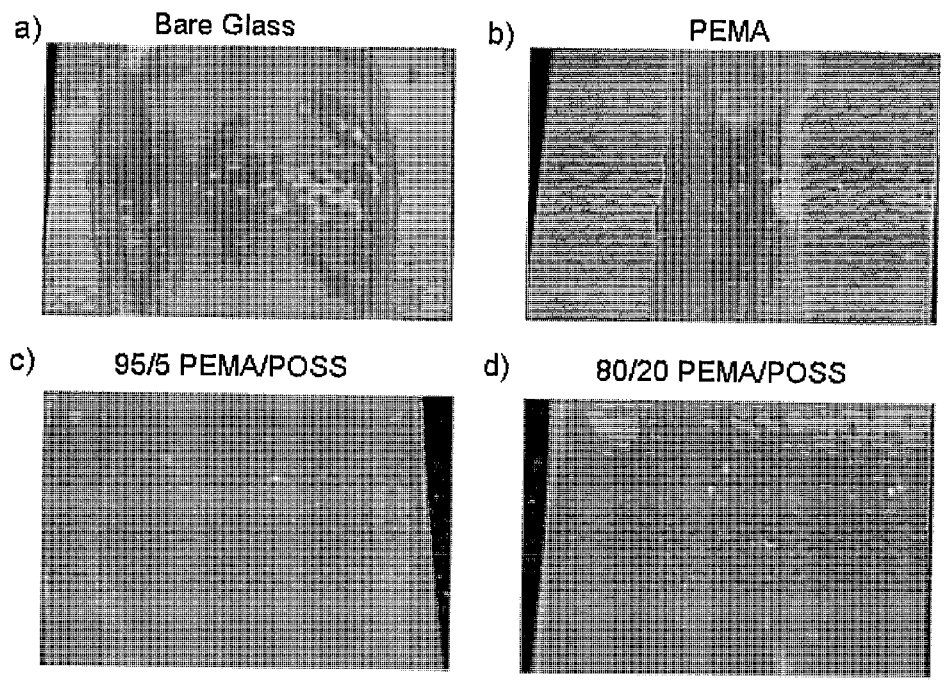

Plots of the advancing and receding liquid contact angles of water, dimethyl sulfoxide, and diiodomethane are provided in FIGS. 5-6 for PEMA/fluorodecyl POSS blends as a function of the fluorodecyl POSS loading. The maximum liquid repellency was obtained with a fluorodecyl POSS loading of only 10-20 wt %, a clear benefit from a cost minimization standpoint. The fingerprint resistances of a series of PEMA/fluorodecyl POSS blends were probed using the following test: (1) stearic acid powder was smashed between a tester's thumb and forefinger; (2) the forefinger was then dragged across glass slides coated with test blends, leaving behind a trail of stearic acid powder; (3) this powder was then blown off using a house air gun operating for 5 seconds from a height of 3.5 cm; and (4) the substrates were visually examined. Photographs of 4 test surfaces subjected to this stearic acid fingerprinting test are shown in FIG. 12. These images clearly reveal that the 80/20 PEMA/fluorodecyl POSS substrates resisted smudging by fingerprints substantially more than bare glass. This resistance may be derived from the low receding surface energy of the coating.

Other methods and materials for quantifying fingerprint resistance of coatings can also be used.

Other embodiments are within the scope of the following claims.

What is claimed is:

1. A method of making a liquid repellent coating on a surface, comprising:
   selecting a polymer and a liquid repelling material based on a measured receding surface energy of a coating including the polymer and the liquid repelling material, wherein the polymer is a poly(ethyl methacrylate) (PEMA), a poly(butyl methacrylate) (PBMA), or a combination thereof; and
   wherein the liquid repelling material is a fluoropolymer;
   determining a ratio of the selected polymer and the selected liquid repelling material based on a measured receding surface energy;
   combining the determined ratio of the selected polymer and the selected liquid repelling material to form a mixture; and
   contacting the mixture with the surface to form a coating including the selected polymer and the selected liquid repelling material on the surface.

2. The method of claim 1, wherein the measured receding surface energy is $\gamma_{sv,r}$, $\gamma_{sv,r}^d$, $\gamma_{sv,r}^p$, $\gamma_{sv,r}^+$, or $\gamma_{sv,r}^-$.

3. The method of claim 2, wherein the measured receding surface energy, $\gamma_{sv,r}$, is no greater than 50 mN m$^{-1}$.

4. The method of claim 2, wherein the measured receding surface energy, $\gamma_{sv,r}$, is no greater than 20 mN m$^{-1}$.

5. The method of claim 2, wherein the measured receding surface energy, $\gamma_{sv,r}$, is no greater than 15 mN m$^{-1}$.

6. The method of claim 1, further comprising measuring a surface energy of a coating including a polymer and nanoparticles prior to selecting.

7. The method of claim 1, wherein the coating is a fingerprint-resistant coating.

8. The method of claim 1, wherein the coating is transparent and optically clear.

9. The method of claim 8, wherein the surface is transparent.

10. The method of claim 1, wherein the fluoropolymer is fluorodecyl polyhedral oligomeric silsesquioxane (fluorodecyl POSS).

11. The method of claim 1, wherein contacting the mixture with the surface includes spin coating.

12. The method of claim 1, wherein the polymer is a poly(ethyl methacrylate) (PEMA).

13. The method of claim 1, wherein the polymer is a poly(butyl methacrylate) (PBMA).

* * * * *